United States Patent
Tsuchiya et al.

(10) Patent No.: US 12,103,588 B2
(45) Date of Patent: Oct. 1, 2024

(54) VEHICLE PLATFORM

(71) Applicant: Kabushiki Kaisha F.C.C., Hamamatsu (JP)

(72) Inventors: Akinori Tsuchiya, Hamamatsu (JP); Keisuke Fujita, Hamamatsu (JP); Shouhei Kasano, Hamamatsu (JP); Keita Hara, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 18/098,814

(22) Filed: Jan. 19, 2023

(65) Prior Publication Data
US 2023/0234642 A1    Jul. 27, 2023

(30) Foreign Application Priority Data

Jan. 21, 2022 (JP) .................. 2022-007966
Jan. 21, 2022 (JP) .................. 2022-007984

(51) Int. Cl.
   *B62D 21/14* (2006.01)
(52) U.S. Cl.
   CPC .................... *B62D 21/14* (2013.01)
(58) Field of Classification Search
   CPC .............. B62D 21/14; B62D 49/0678; B62B 2206/02; B66F 9/07522; B60G 2300/40
   See application file for complete search history.

(56) References Cited

U.S. PATENT DOCUMENTS 3,899,037 A * 8/1975 Yuker ............. B60G 17/01925
                                                      180/41
4,079,807 A * 3/1978 Hornagold ......... B62D 49/0678
                                                      180/414

FOREIGN PATENT DOCUMENTS

| CN | 106005017 A | * 10/2016 | ............. B62D 21/14 |
| CN | 107416074 A | * 12/2017 | |
| CN | 109373953 A | * 2/2019 | ............. B62D 21/14 |
| CN | 112572610 A | * 3/2021 | ............... B60P 1/43 |
| EP | 4257460 A1 | * 10/2023 | ............. B62D 37/00 |
| JP | 2014-221612 A | 11/2014 | |
| WO | WO-2004024541 A1 | * 3/2004 | ............. B62D 21/14 |
| WO | WO-2006112732 A1 | * 10/2006 | ............. A61G 5/046 |

OTHER PUBLICATIONS

Obry, Universal Transport Vehicle With Adjustable Track, Wheel Spacing and Ground Clearance, Mar. 25, 2004, EPO, WO 2004024541 A1, Machine Translation of Description (Year: 2004).*

* cited by examiner

*Primary Examiner* — Paul N Dickson
*Assistant Examiner* — Matthew D Lee
(74) *Attorney, Agent, or Firm* — Keating & Bennett, LLP

(57) ABSTRACT

A vehicle platform includes a first wheel, a second wheel, and a first orientation keeper to move the first wheel in a vehicle width direction and keep an orientation of the first wheel with respect to a front-rear direction of a vehicle during movement of the first wheel. The first orientation keeper includes a first center body, a first wheel arm, and a first rotation actuator. The first center body is between the first wheel and the second wheel. The first wheel arm is rotatably connected to the first center body, extends between the first center body and the first wheel, and supports the first wheel. The first rotation actuator is operable to rotate the first wheel arm relative to the first center body such that the first wheel moves toward or away from the first center body.

14 Claims, 13 Drawing Sheets

VEHICLE PLATFORM

CROSS REFERENCE TO RELATED APPLICATIONS

This application claims the benefit of priority to Japanese Patent Application No. 2022-007966 and Japanese Patent Application No. 2022-007984 filed on Jan. 21, 2022. The entire contents of these applications are incorporated herein by reference.

BACKGROUND OF THE INVENTION

1. Field of the Invention

The present invention relates generally to vehicle platforms. More particularly, the present invention relates to a vehicle platform constituting a self-propelled vehicle that is able to transport cargo or person(s).

2. Description of the Related Art

As is known in the related art, some vehicle platforms that constitute self-propelled vehicles are able to increase and reduce track widths. As used herein, the term "track width" refers to the distance between right and left wheels. JP 2014-221612 A, for example, discloses a vehicle frame apparatus configured to increase and reduce a track width by sliding a wheel-side annular member on a main rotation shaft extending in the width direction of a vehicle.

Unfortunately, the frame apparatus disclosed in JP 2014-221612 A fails to allow the vehicle to travel while the distance (or track width) between right and left wheels is reduced and thus limits the use of the vehicle.

SUMMARY OF THE INVENTION

Accordingly, preferred embodiments of the present invention provide vehicle platforms, each of which allows a vehicle to travel while the distance between wheels is reduced.

According to a preferred embodiment of the present invention, a vehicle platform of a vehicle includes a first wheel on a first side in a vehicle width direction, a second wheel on a second side in the vehicle width direction, a drive motor to drive the first wheel and the second wheel, and a first orientation keeper to move the first wheel in the vehicle width direction and keep an orientation of the first wheel with respect to a front-rear direction of the vehicle during movement of the first wheel. The first orientation keeper includes a center body between the first wheel and the second wheel and supported by the first wheel and the second wheel, a first wheel arm rotatably connected to the center body, extending between the center body and the first wheel, and supporting the first wheel, and a first rotation actuator to rotate the first wheel arm relative to the center body such that the first wheel moves toward or away from the center body.

The first rotation actuator of the first orientation keeper is operable to rotate the first wheel arm relative to the center body so as to move the first wheel toward or away from the center body. The vehicle platform is thus able to increase and reduce the distance (or track width) between the first wheel and the second wheel during travel of the vehicle. The first orientation keeper is operable to keep the orientation of the first wheel with respect to the front-rear direction of the vehicle during the movement of the first wheel. Accordingly, the vehicle platform would allow the vehicle to travel while keeping the orientation of the first wheel if the distance between the first wheel and the second wheel is changed.

In a preferred embodiment of the present invention, the vehicle platform further includes a second orientation keeper to move the second wheel in the vehicle width direction and keep an orientation of the second wheel with respect to the front-rear direction of the vehicle during the movement of the second wheel. The second orientation keeper includes a second wheel arm rotatably connected to the center body, extending between the center body and the second wheel, and supporting the second wheel, and a second rotation actuator to rotate the second wheel arm relative to the center body such that the second wheel moves toward or away from the center body.

In this preferred embodiment, the second rotation actuator of the second orientation keeper is operable to rotate the second wheel arm relative to the center body such that the second wheel moves toward or away from the center body. The vehicle platform is thus able to increase and reduce the distance (or track width) between the first wheel and the second wheel during travel of the vehicle. The second orientation keeper is operable to keep the orientation of the second wheel with respect to the front-rear direction of the vehicle during the movement of the second wheel. Accordingly, the vehicle platform would allow the vehicle to travel while keeping the orientation of the second wheel if the distance between the first wheel and the second wheel is changed.

In another preferred embodiment of the present invention, the first orientation keeper includes a first supporting shaft extending vertically in the center body and supporting the first wheel arm such that the first wheel arm is rotatable.

This preferred embodiment is able to facilitate rotating the first wheel arm around the first supporting shaft relative to the center body.

In still another preferred embodiment of the present invention, the second orientation keeper includes a second supporting shaft extending vertically in the center body and supporting the second wheel arm such that the second wheel arm is rotatable.

This preferred embodiment is able to facilitate rotating the second wheel arm around the second supporting shaft relative to the center body.

In yet another preferred embodiment of the present invention, the first orientation keeper includes a first supporting shaft extending vertically in the center body and supporting the first wheel arm such that the first wheel arm is rotatable, and a first wheel support rotatably connected to the first wheel arm and supporting the first wheel thereon, and the second orientation keeper includes a second supporting shaft extending vertically in the center body and supporting the second wheel arm such that the second wheel arm is rotatable, and a second wheel support rotatably connected to the second wheel arm and supporting the second wheel thereon. The first rotation actuator and the second rotation actuator rotate the first wheel arm around the first supporting shaft such that the first wheel support rotates, and rotate the second wheel arm around the second supporting shaft such that the second wheel support rotates, causing the first wheel and the second wheel to move in the vehicle width direction in a reciprocating manner.

In this preferred embodiment, the first wheel support with the first wheel supported thereon and the second wheel support with the second wheel supported thereon each rotate relative to the center body. This preferred embodiment is thus able to facilitate moving the first wheel and the second wheel in the vehicle width direction in a reciprocating manner.

In still yet another preferred embodiment of the present invention, the first wheel includes a plurality of first wheels, and the second wheel includes a plurality of second wheels. The plurality of first wheels includes a first front wheel and a first rear wheel. The plurality of second wheels includes a second front wheel and a second rear wheel. The center body includes a front center body between the first front wheel and the second front wheel and supported by the first front wheel and the second front wheel, and a rear center body between the first rear wheel and the second rear wheel and supported by the first rear wheel and the second rear wheel. The first supporting shaft includes a plurality of first supporting shafts, and the second supporting shaft includes a plurality of second supporting shafts. The first rotation actuator and the second rotation actuator move the first supporting shaft of the front center body and the first supporting shaft of the rear center body toward or away from each other in the front-rear direction of the vehicle, and move the second supporting shaft of the front center body and the second supporting shaft of the rear center body toward or away from each other in the front-rear direction of the vehicle.

In this preferred embodiment, the first rotation actuator and the second rotation actuator move the first and second supporting shafts of the front center body and the first and second supporting shafts of the rear center body toward or away from each other in the front-rear direction of the vehicle. This preferred embodiment is thus able to increase or reduce the distance between the first wheel and the second wheel.

In another preferred embodiment of the present invention, the drive motor includes a first wheel drive motor to drive at least one of the first wheels, and a second wheel drive motor to drive at least one of the second wheels.

This preferred embodiment is able to drive the first and second wheels independently.

In still another preferred embodiment of the present invention, the first rotation actuator and the second rotation actuator are driven during travel of the vehicle such that the first wheel and the second wheel move toward or away from the center body.

This preferred embodiment is able to change the distance between the first wheel and the second wheel during travel of the vehicle.

Another vehicle platform of a vehicle includes a first wheel on a first side in a vehicle width direction, a second wheel on a second side in the vehicle width direction, a first wheel drive motor to drive the first wheel, a second wheel drive motor to drive the second wheel, and a distance changer to change a distance between the first wheel and the second wheel in the vehicle width direction. The distance changer includes a first wheel support supporting the first wheel and the first wheel drive motor, and a second wheel support supporting the second wheel and the second wheel drive motor. The distance changer is configured or programmed to change the distance between the first wheel and the second wheel by moving at least one of the first wheel support and the second wheel support toward or away from the other one of the first wheel support and the second wheel support in the vehicle width direction. With the first wheel and the second wheel located farthest away from each other in the vehicle width direction, the first wheel drive motor and the second wheel drive motor are located at different positions in at least one of a front-rear direction of the vehicle and an up-down direction of the vehicle. The distance changer moves the first wheel support and the second wheel support toward each other such that the first wheel drive motor and the second wheel drive motor are at least partially located at corresponding positions in the vehicle width direction when viewed from a position in front of the vehicle.

The vehicle platform according to the present preferred embodiment is configured such that with the first wheel and the second wheel located farthest away from each other in the vehicle width direction, the first wheel drive motor and the second wheel drive motor are located at different positions in at least one of the front-rear direction of the vehicle and the up-down direction of the vehicle. The distance changer moves the first wheel support and the second wheel support toward each other such that the first wheel drive motor and the second wheel drive motor are at least partially located at corresponding positions in the vehicle width direction when viewed from the position in front of the vehicle. As described above, with the first wheel and the second wheel located farthest away from each other in the vehicle width direction, the first wheel drive motor and the second wheel drive motor are located at different positions in at least one of the front-rear direction of the vehicle and the up-down direction of the vehicle. Accordingly, the first wheel drive motor and the second wheel drive motor would be prevented from coming into contact with each other (or interfering with each other) if the first wheel support and the second wheel support are brought close to each other. Consequently, the vehicle platform according to the present preferred embodiment is able to further reduce the distance (or track width) between the first wheel and the second wheel.

In a preferred embodiment of the present invention, with the first wheel and the second wheel located farthest away from each other in the vehicle width direction, the first wheel drive motor and the second wheel drive motor are located at different positions in the vehicle width direction when viewed from the position in front of the vehicle.

In this preferred embodiment, the vehicle platform is able to further reduce the distance between the first wheel and the second wheel.

In another preferred embodiment of the present invention, with the first wheel and the second wheel located farthest away from each other in the vehicle width direction, the first wheel drive motor is located between the first wheel and a center line of the vehicle in the vehicle width direction, and the second wheel drive motor is located between the second wheel and the center line of the vehicle in the vehicle width direction. The center line extends in the front-rear direction of the vehicle.

In this preferred embodiment, the first wheel drive motor and the second wheel drive motor are arranged in a well-balanced manner in the vehicle width direction. This preferred embodiment is thus able to improve the running stability of the vehicle platform.

In still another preferred embodiment of the present invention, the first wheel drive motor and the second wheel drive motor are positioned at equal or substantially equal heights in the up-down direction of the vehicle.

The present preferred embodiment is able to improve the running stability of the vehicle platform.

In yet another preferred embodiment of the present invention, when the first wheel drive motor and the second wheel drive motor are located closest to each other in the vehicle width direction, the first wheel drive motor and the second wheel drive motor overlap with the center line in a plan view.

In this preferred embodiment, when the first wheel drive motor and the second wheel drive motor are located closest to each other in the vehicle width direction, the center of gravity of the vehicle platform is located at or around the center of the vehicle platform in the vehicle width direction. This preferred embodiment is thus able to improve the running stability of the vehicle platform.

Various preferred embodiments of the present invention provide vehicle platforms, each of which allows a vehicle to travel while the distance between wheels is reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Vehicle platforms according to preferred embodiments of the present invention will be described below with reference to the drawings.

First Preferred Embodiment

Figure 1:
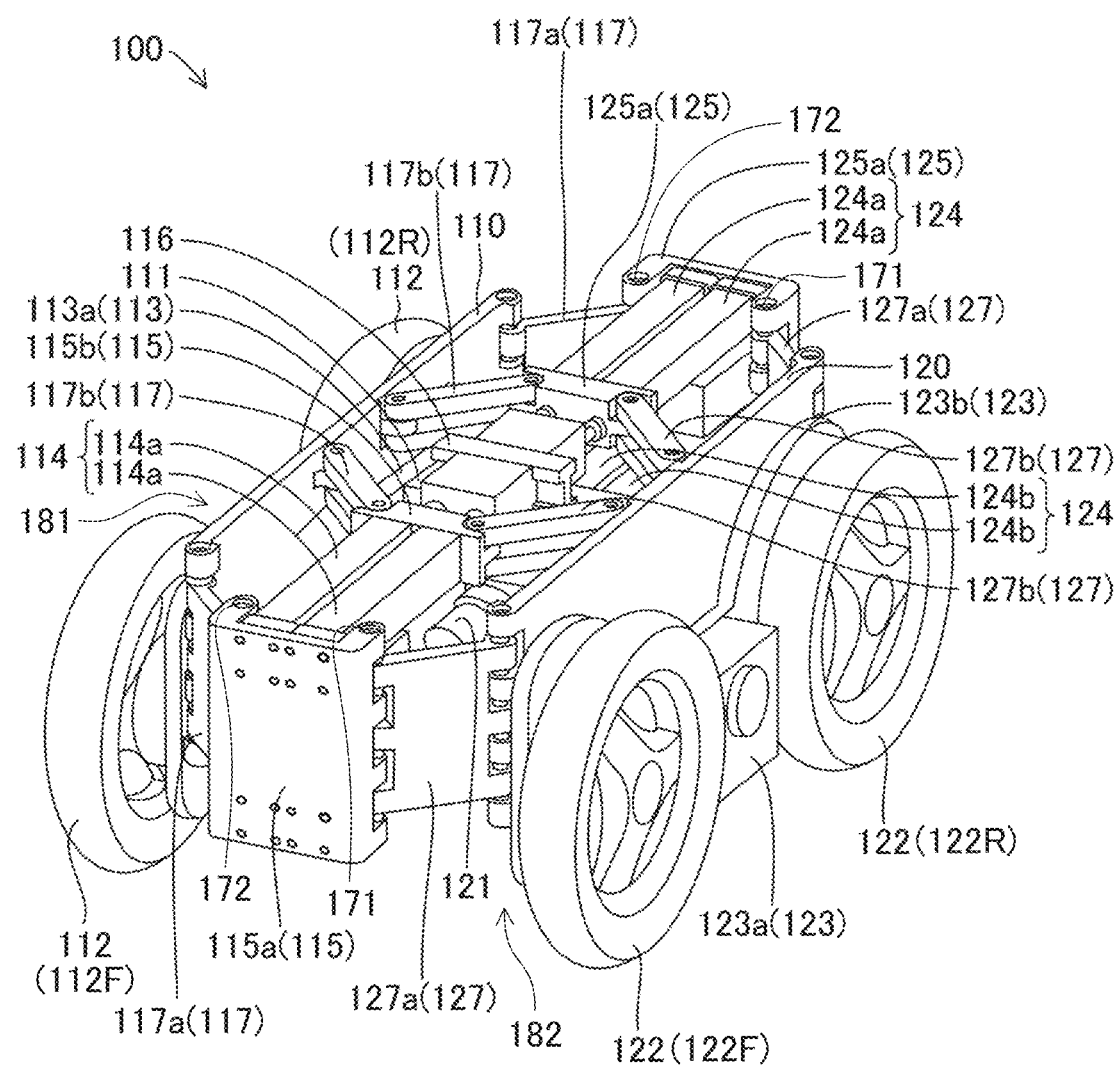
FIG. 1 is a schematic perspective view of the overall structure of a vehicle platform according to a first preferred embodiment of the present invention.
Figure 2:
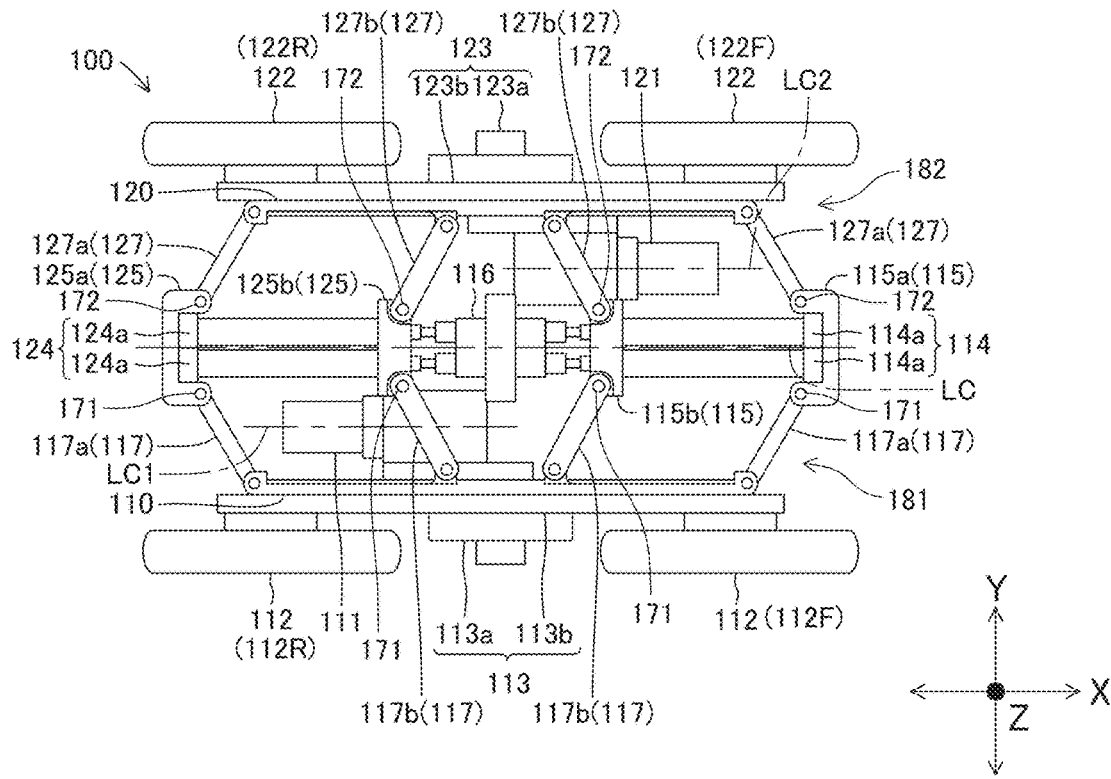
FIG. 2 is a schematic plan view of the external appearance of the vehicle platform illustrated in FIG. 1.
Figure 3:
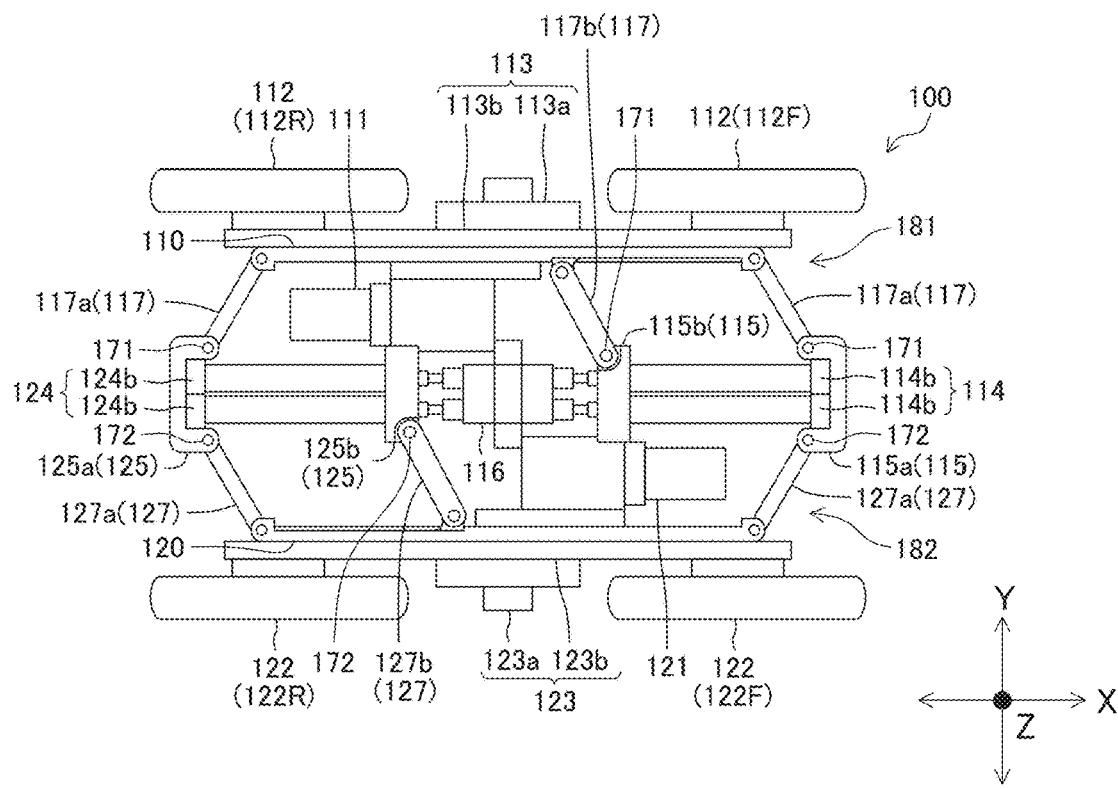
FIG. 3 is a schematic bottom view of the external appearance of the vehicle platform illustrated in FIG. 1.
Figure 4:
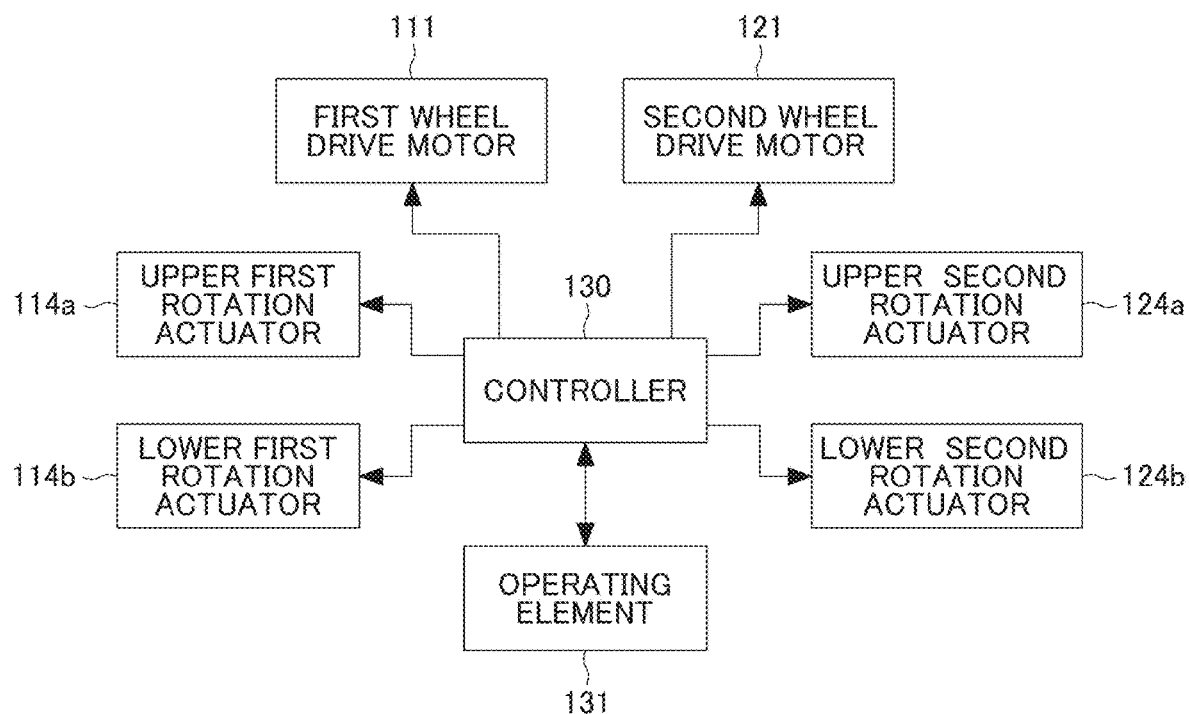
FIG. 4 is a schematic block diagram of a control system for the vehicle platform illustrated in FIG. 1.
Figure 5:
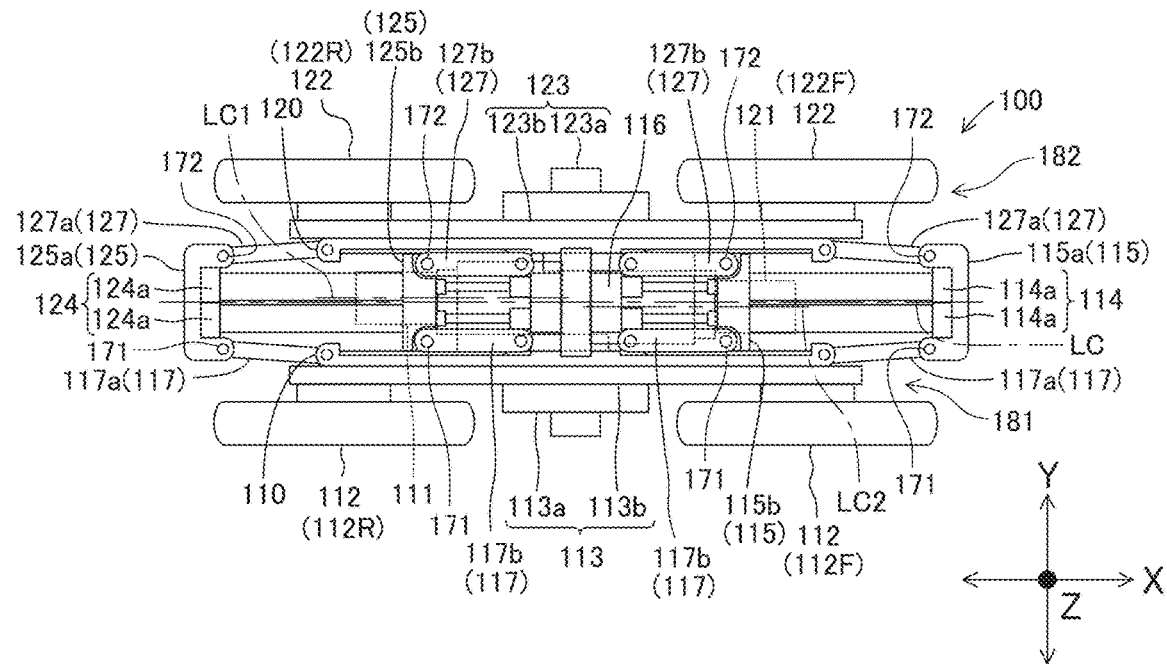
FIG. 5 is a schematic plan view of the external appearance of the vehicle platform illustrated in FIG. 1, with its track width reduced.
Figure 6:
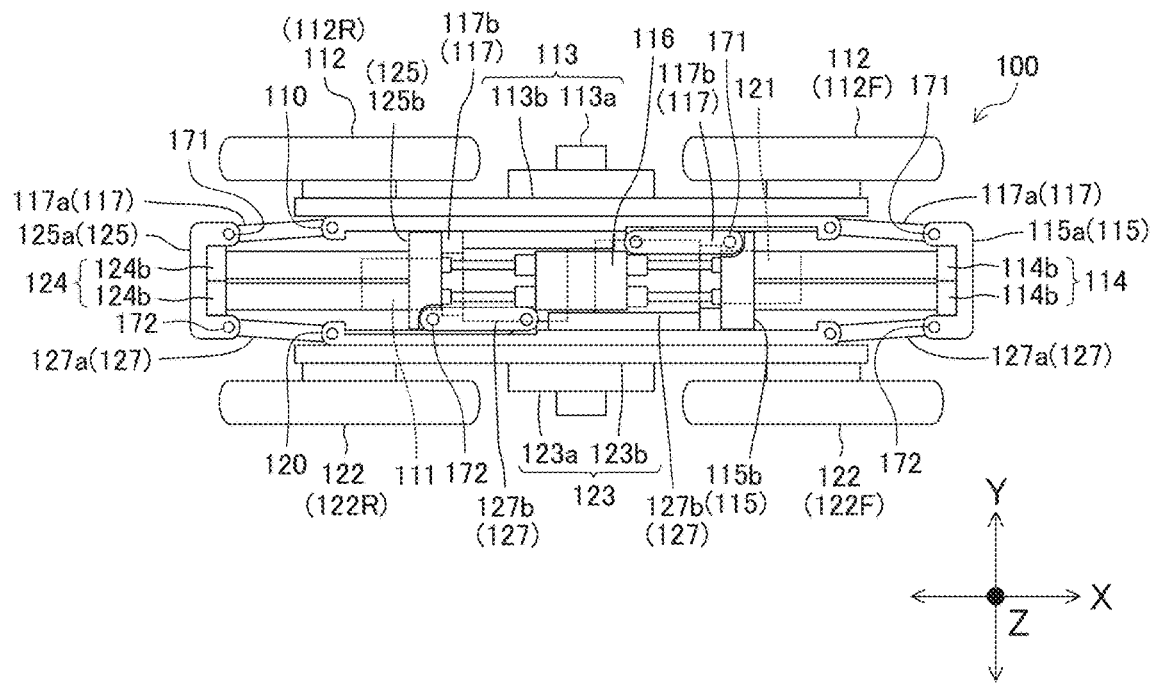
FIG. 6 is a schematic bottom view of the external appearance of the vehicle platform illustrated in FIG. 1, with its track width reduced.

A vehicle platform 100 according to a first preferred embodiment of the present invention will be described. FIG. 1 is a schematic perspective view of the overall structure of a vehicle platform 100 of a vehicle. FIG. 2 is a schematic plan view of the external appearance of the vehicle platform 100 illustrated in FIG. 1, with its track width increased (e.g., with its first and second wheels 112 and 122 located farthest away from each other). FIG. 3 is a schematic bottom view of the external appearance of the vehicle platform 100 illustrated in FIG. 1. FIG. 4 is a schematic block diagram of a control system for the vehicle platform 100 illustrated in FIG. 1. FIG. 5 is a schematic plan view of the external appearance of the vehicle platform 100 illustrated in FIG. 1, with its track width reduced (e.g., with its first and second wheels 112 and 122 located closest to each other). FIG. 6 is a schematic bottom view of the external appearance of the vehicle platform 100 illustrated in FIG. 1, with its track width reduced. As used herein, the term "X-axis direction" refers to a front-rear direction of the vehicle platform 100 (which corresponds to the direction of travel of the vehicle platform 100). The term "Y-axis direction" refers to a vehicle width direction perpendicular or substantially perpendicular to the X-axis direction in a plan view. The term "Z-axis direction" refers to an up-down direction perpendicular or substantially perpendicular to the X-axis direction and the Y-axis direction.

The vehicle platform 100 is a main component of a self-propelled work vehicle (not illustrated) that travels on rough terrain (e.g., on a farm or a plantation) under remote control by an operator. Such a self-propelled work vehicle is used to transport cargo, for example.

As illustrated in FIG. 1, the vehicle platform 100 includes a first wheel supporting member 110 (first wheel support) having the first wheels 112 disposed thereon, and a second wheel supporting member 120 (second wheel support) having the second wheels 122 disposed thereon. The first wheel supporting member 110 and the second wheel supporting member 120 respectively define right and left side walls of the vehicle platform 100. Main components of the vehicle platform 100 are attached to the first wheel supporting member 110 and the second wheel supporting member 120. The vehicle platform 100 further includes a drive motor to drive the first wheels 112 and the second wheels 122. The drive motor includes a first wheel drive motor 111 and a second wheel drive motor 121.

Specifically, the first wheel drive motor 111, the first wheels 112, and a first driving force transmitter 113 are attached to the first wheel supporting member 110. A first center member 115 (center body) and a second center member 125 (center body) are connected to the first wheel supporting member 110 through first wheel arms 117. The second wheel drive motor 121, the second wheels 122, and a second driving force transmitter 123 are attached to the second wheel supporting member 120. The first center member 115 and the second center member 125 are connected to the second wheel supporting member 120 through second wheel arms 127. The first center member 115 is an example of a front center member (front center body). The second center member 125 is an example of a rear center member (rear center body). The first center member 115 is disposed between a first front wheel 112F and a second front wheel 122F (which will be described below). The second center member 125 is disposed between a first rear wheel 112R and a second rear wheel 122R (which will be described below).

The first wheel supporting member 110 and the second wheel supporting member 120 are each made of a metal material or a resin material. The first wheel supporting member 110 and the second wheel supporting member 120 each have a plate shape extending in the direction of travel of the vehicle platform 100 and rising upward. When a first rotation actuator 114 (which will be described below) and a second rotation actuator 124 (which will be described below) disposed on a straight line in the X-axis direction are each in a contracted state, the length of each of the first wheel supporting member 110 and the second wheel supporting member 120 in the X-axis direction is shorter than the total length of the first rotation actuator 114 and the second rotation actuator 124 in the X-axis direction. The first wheel supporting member 110 and the second wheel supporting member 120 are spaced away from each other and face each other in the vehicle width direction (i.e., the Y-axis direction).

Although on-board components (examples of which include a carrier, a machine, a tool, and a device) to enable the vehicle platform 100 to function as the self-propelled work vehicle are attached to the first wheel supporting member 110 and the second wheel supporting member 120, these components are not directly related to preferred embodiments of the present invention and will thus not be described.

The first wheel drive motor 111 is a driving source to rotate the first wheels 112. The second wheel drive motor 121 is a driving source to rotate the second wheels 122. Each of the first wheel drive motor 111 and the second wheel drive motor 121 is a synchronous motor, operations of which are to be controlled by a controller 130 (which will be described below). Each of the first wheel drive motor 111 and the second wheel drive motor 121 may naturally be a direct-current motor.

The first wheel drive motor 111 and the second wheel drive motor 121 are respectively attached to inner surfaces of the first wheel supporting member 110 and the second wheel supporting member 120 facing each other. Specifically, the first wheel drive motor 111 is attached to a portion of the inner surface of the first wheel supporting member 110 located on a first side in the X-axis direction where the first rear wheel 112R is disposed (see FIG. 2), and the second wheel drive motor 121 is attached to a portion of the inner surface of the second wheel supporting member 120 located on a second side in the X-axis direction where the second front wheel 122F is disposed (see FIG. 2).

Figure 7A:
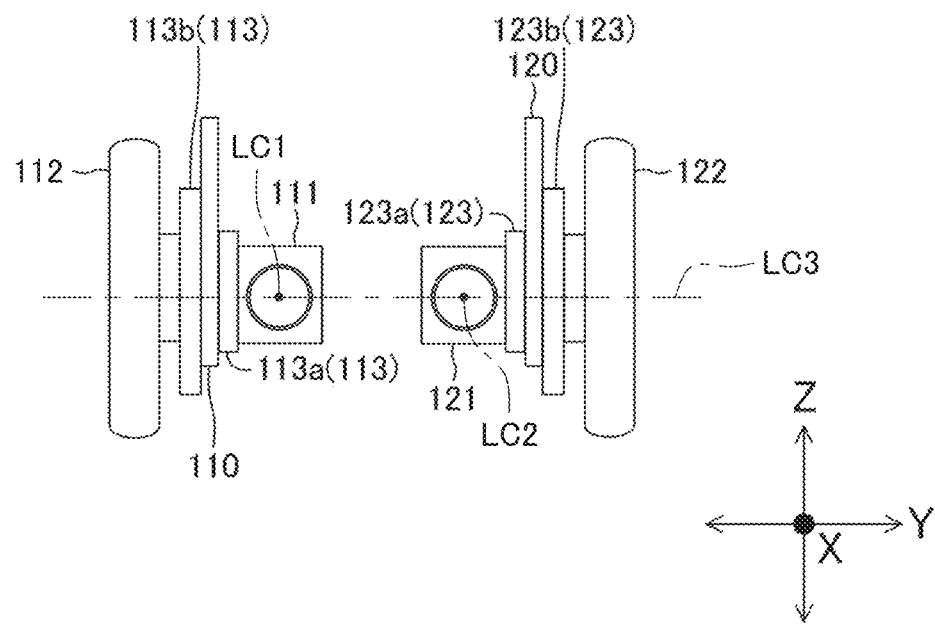
FIG. 7A is a schematic front view of the vehicle platform illustrated in FIG. 1, with its track width increased.
Figure 7B:
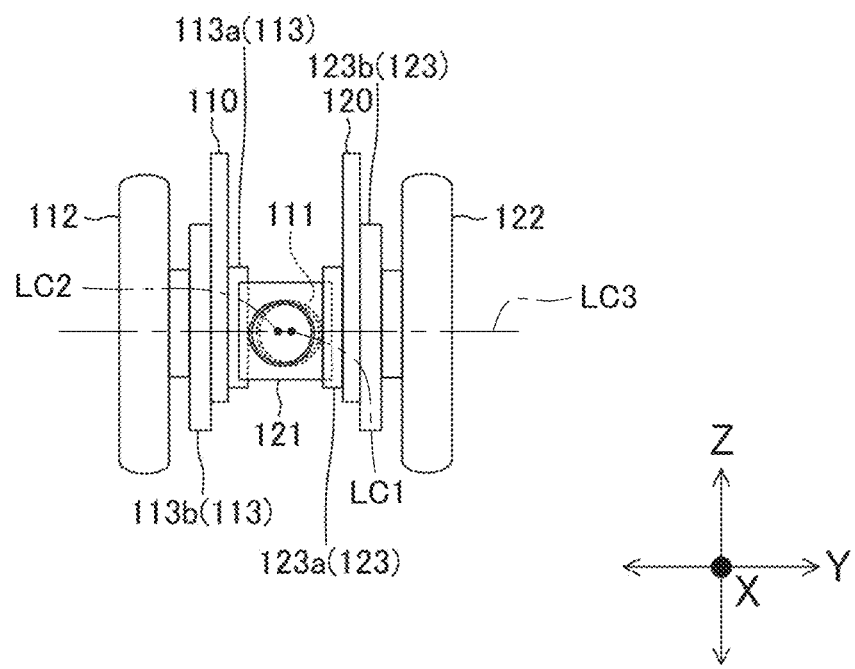
FIG. 7B is a schematic front view of the vehicle platform illustrated in FIG. 1, with its track width reduced.

The first wheel drive motor 111 and the second wheel drive motor 121 are disposed at different positions in the front-rear direction of the vehicle platform 100 perpendicular or substantially perpendicular to the vehicle width direction, such that the first wheel drive motor 111 and the second wheel drive motor 121 do not face each other in the vehicle width direction. With the first and second wheels 112 and 122 located farthest away from each other in the vehicle width direction, the first wheel drive motor 111 and the second wheel drive motor 121 are disposed at different positions in at least one of the front-rear direction of the vehicle and the up-down direction of the vehicle. As used herein, the term "front-rear direction of the vehicle" refers to the front-rear direction of the vehicle platform 100, and the term "up-down direction of the vehicle" refers to the up-down direction of the vehicle platform 100. In the present preferred embodiment, with the first and second wheels 112 and 122 located farthest away from each other in the vehicle width direction, the first wheel drive motor 111 and the second wheel drive motor 121 are located at different positions in the vehicle width direction when viewed from a position in front of the vehicle. With the first and second wheels 112 and 122 located closest to each other in the vehicle width direction, the first wheel drive motor 111 and the second wheel drive motor 121 are located adjacent to each other in a central region of the vehicle platform 100 in the front-rear direction. With the first and second wheels 112 and 122 located farthest away from each other in the vehicle width direction as illustrated in FIG. 2, the first wheel drive motor 111 and the second wheel drive motor 121 are symmetric with respect to a central point in the front-rear direction and width direction of the vehicle platform 100. With the first and second wheels 112 and 122 located farthest away from each other, the first wheel drive motor 111 is located between a center line LC of the vehicle (which extends in the front-rear direction) and the first wheels 112 in the vehicle width direction. With the first and second wheels 112 and 122 located farthest away from each other, a center line LC1 of the first wheel drive motor 111, which extends in the front-rear direction, is located between the center line LC and the first wheels 112 in the vehicle width direction. With the first and second wheels 112 and 122 located farthest away from each other, the second wheel drive motor 121 is located between the center line LC of the vehicle (which extends in the front-rear direction) and the second wheels 122 in the vehicle width direction. With the first and second wheels 112 and 122 located farthest away from each other, a center line LC2 of the second wheel drive motor 121, which extends in the front-rear direction, is located between the center line LC and the second wheels 122 in the vehicle width direction. With the first and second wheels 112 and 122 located closest to each other as illustrated in FIG. 5, the center line LC1 is located between the center line LC and the second wheels 122 in the vehicle width direction. With the first and second wheels 112 and 122 located closest to each other as illustrated in FIG. 5, the center line LC2 is located between the center line LC and the first wheels 112 in the vehicle width direction. With the first and second wheels 112 and 122 located closest to each other, the center line LC1 and the center line LC2 may overlap with each other. As illustrated in FIGS. 7A and 7B, a straight line LC3 extending in the vehicle width direction intersects the center line LC1 and the center line LC2. The straight line LC3 is a horizonal line.

As illustrated in FIGS. 7A and 7B, the first wheel drive motor 111 and the second wheel drive motor 121 are positioned at equal or substantially equal heights in the up-down direction (i.e., the Z-axis direction). When viewed in the Y-axis direction, the first wheel drive motor 111 is located between upper second rotation actuators 124a and lower second rotation actuators 124b, and the second wheel drive motor 121 is located between upper first rotation actuators 114a and lower first rotation actuators 114b. Alternatively, the first wheel drive motor 111 and the second wheel drive motor 121 may be positioned at different heights in the up-down direction (i.e., the Z-axis direction). To clarify the positional relationship between the first wheel drive motor 111 and the second wheel drive motor 121, FIGS. 7A and 7B each illustrate only the first wheel supporting member 110, the first wheel drive motor 111, one of the first wheels 112, the first driving force transmitter 113 (which includes a speed reduction mechanism 113a and a belt transmission mechanism 113b), the second wheel supporting member 120, the second wheel drive motor 121, one of the second wheels 122, and the second driving force transmitter 123 (which includes a speed reduction mechanism 123a and a belt transmission mechanism 123b).

The first and second wheels 112 and 122 are pairs of right and left components that roll on a road surface so as to move the vehicle platform 100 forward or rearward. The first and second wheels 112 and 122 are each made of metal and each have a rubber tire attached to its rim. The first wheels 112 are disposed on a first side in the vehicle width direction (i.e., on the lower side in FIG. 2). The second wheels 122 are disposed on a second side in the vehicle width direction (i.e., on the upper side in FIG. 2). The first wheels 112 are two wheels disposed in alignment with each other in the direction of travel of the vehicle platform 100 (i.e., the X-axis direction). The second wheels 122 are two wheels disposed in alignment with each other in the direction of travel of the vehicle platform 100 (i.e., the X-axis direction).

One of the two first wheels 112 functions as a front wheel, and the other one of the two first wheels 112 functions as a rear wheel. One of the two second wheels 122 functions as a front wheel, and the other one of the two second wheels 122 functions as a rear wheel. The two first wheels 112 are attached to an outer surface of the first wheel supporting member 110 through the first driving force transmitter 113. The two second wheels 122 are attached to an outer surface of the second wheel supporting member 120 through the second driving force transmitter 123. As illustrated in FIG. 2, the first wheels 112 include the first front wheel 112F and the first rear wheel 112R arranged in the front-rear direction of the vehicle, and the second wheels 122 include the second front wheel 122F and the second rear wheel 122R arranged in the front-rear direction of the vehicle.

The first driving force transmitter 113 transmits, to each of the first wheels 112, a driving force generated by the first wheel drive motor 111. The second driving force transmitter 123 transmits, to each of the second wheels 122, a driving force generated by the second wheel drive motor 121. Specifically, the first driving force transmitter 113 includes the speed reduction mechanism 113a and the belt transmission mechanism 113b, and the second driving force transmitter 123 includes the speed reduction mechanism 123a and the belt transmission mechanism 123b.

The speed reduction mechanism 113a includes a gear train (not illustrated) to decelerate the driving force generated by the first wheel drive motor 111. The speed reduction mechanism 123a includes a gear train (not illustrated) to decelerate the driving force generated by the second wheel drive motor 121. The belt transmission mechanism 113b includes a V belt (not illustrated) and pulleys (not illustrated) to transmit, to the two first wheels 112, the driving force decelerated by the speed reduction mechanism 113a. The belt transmission mechanism 123b includes a V belt (not illustrated) and pulleys (not illustrated) to transmit, to the two second wheels 122, the driving force decelerated by the speed reduction mechanism 123a.

The first driving force transmitter 113 may include a chain transmission mechanism or a gear transmission mechanism instead of the belt transmission mechanism 113b. The second driving force transmitter 123 may include a chain transmission mechanism or a gear transmission mechanism instead of the belt transmission mechanism 123b. The speed reduction mechanisms 113a and 123a and the belt transmission mechanisms 113b and 123b each have a structure known in the art. Thus, FIGS. 1 to 3 illustrate an outer case housing the speed reduction mechanism 113a, an outer case housing the speed reduction mechanism 123a, an outer case housing the belt transmission mechanism 113b, and an outer case housing the belt transmission mechanism 123b.

The first driving force transmitter 113 is disposed on a central portion of the first wheel supporting member 110 in the X-axis direction. The second driving force transmitter 123 is disposed on a central portion of the second wheel supporting member 120 in the X-axis direction. The first driving force transmitter 113 and the second driving force transmitter 123 respectively pass through the first wheel supporting member 110 and the second wheel supporting member 120. Specifically, the first driving force transmitter 113 passes through the first wheel supporting member 110, with the speed reduction mechanism 113a connected to an output shaft (not illustrated) of the first wheel drive motor 111 on the inner surface of the first wheel supporting member 110 such that power is transmittable between the speed reduction mechanism 113a and the first wheel drive motor 111. The second driving force transmitter 123 passes through the second wheel supporting member 120, with the speed reduction mechanism 123a connected to an output shaft (not illustrated) of the second wheel drive motor 121 on the inner surface of the second wheel supporting member 120 such that power is transmittable between the speed reduction mechanism 123a and the second wheel drive motor 121.

The belt transmission mechanism 113b and the belt transmission mechanism 123b are respectively disposed on the outer surfaces of the first wheel supporting member 110 and the second wheel supporting member 120. The driving force input side of the belt transmission mechanism 113b is connected to the speed reduction mechanism 113a such that power is transmittable therebetween, and the driving force output side of the belt transmission mechanism 113b is connected to each of the two first wheels 112 such that power is transmittable therebetween. The driving force input side of the belt transmission mechanism 123b is connected to the speed reduction mechanism 123a such that power is transmittable therebetween, and the driving force output side of the belt transmission mechanism 123b is connected to each of the two second wheels 122 such that power is transmittable therebetween.

The first rotation actuator 114, the second rotation actuator 124, the first center member 115, the second center member 125, an intermediate member 116, the first wheel arms 117, and the second wheel arms 127 are disposed between the first wheel supporting member 110 and the second wheel supporting member 120.

The first rotation actuator 114 and the second rotation actuator 124 are driving sources to generate driving forces for moving the first and second wheels 112 and 122 away from and toward each other (i.e., driving forces for moving the first and second wheels 112 and 122 in the vehicle width direction in a reciprocating manner). The first rotation actuator 114 is configured to rotate the first wheel arms 117 relative to the first center member 115 and the second center member 125 such that the first wheels 112 move toward or away from the first center member 115 and the second center member 125. The second rotation actuator 124 is configured to rotate the second wheel arms 127 relative to the first center member 115 and the second center member 125 such that the second wheels 122 move toward or away from the first center member 115 and the second center member 125. The first rotation actuator 114 and the second rotation actuator 124 rotate the first wheel arms 117 around first supporting shafts 171 of the first and second center members 115 and 125 such that the first wheel supporting member 110 rotates, and rotate the second wheel arms 127 around second supporting shafts 172 of the first and second center members 115 and 125 such that the second wheel supporting member 120 rotates, causing the first and second wheels 112 and 122 to move in the vehicle width direction in a reciprocating manner. The first rotation actuator 114 and the second rotation actuator 124 move the first supporting shafts 171 of the first center member 115 and the first supporting shafts 171 of the second center member 125 toward or away from each other in the front-rear direction of the vehicle, and move the second supporting shafts 172 of the first center member 115 and the second supporting shafts 172 of the second center member 125 toward or away from each other in the front-rear direction of the vehicle. The first rotation actuator 114 and the second rotation actuator 124 are driven during travel of the vehicle so as to move the first wheels 112 and the second wheels 122 toward or away from the first center member 115 and the second center member 125. The first rotation actuator 114 and the second rotation actuator 124 include electric linear motion cylinders each including a piston rod that makes a linear motion within the cylinder in response to being driven by an electric motor. In the present preferred embodiment, the first rotation actuator 114 and the second rotation actuator 124 each include four electric linear motion cylinders, for example.

Two of the four electric linear motion cylinders included in the first rotation actuator 114 are the upper first rotation actuators 114a disposed in an upper internal space of the vehicle platform 100. The other two of the four electric linear motion cylinders included in the first rotation actuator 114 are the lower first rotation actuators 114b disposed under the upper first rotation actuators 114a. Two of the four electric linear motion cylinders included in the second rotation actuator 124 are the upper second rotation actuators 124a disposed in the upper internal space of the vehicle platform 100. The other two of the four electric linear motion cylinders included in the second rotation actuator 124 are the lower second rotation actuators 124b disposed under the upper second rotation actuators 124a. Operations of the first rotation actuator 114 and the second rotation actuator 124 are controlled by the controller 130.

The first center member 115 and the second center member 125 are disposed between the first wheels 112 and the second wheels 122. The first center member 115 and the second center member 125 are supported by the first wheels 112 through the first wheel supporting member 110 and the first wheel arms 117 and supported by the second wheels 122 through the second wheel supporting member 120 and the second wheel arms 127. The first center member 115 supports the upper first rotation actuators 114a and the lower first rotation actuators 114b. The second center member 125 supports the upper second rotation actuators 124a and the lower second rotation actuators 124b.

The first center member 115 and the second center member 125 are each made of a metal material or a resin material.

The first center member 115 and the second center member 125 each have a block shape extending in the Z-axis direction. Because the first center member 115 and the second center member 125 are symmetric with respect to a symmetry axis extending in the Y-axis direction (see FIGS. 2 and 3), the first center member 115 will mainly be described. The first center member 115 includes an outer first center member 115a and two inner first center members 115b.

The outer first center member 115a supports the rear ends of the two upper first rotation actuators 114a and the two lower first rotation actuators 114b. The outer first center member 115a is a substantially U-shaped plate in the plan view.

One of the two inner first center members 115b supports the front ends of the two upper first rotation actuators 114a. The other one of the two inner first center members 115b supports the front ends of the two lower first rotation actuators 114b. One of the two inner first center members 115b has a block shape through which the upper first rotation actuators 114a pass. The other one of the two inner first center members 115b has a block shape through which the lower first rotation actuators 114b pass. One of the two inner first center members 115b is disposed in the upper internal space of the vehicle platform 100. The other one of the two inner first center members 115b is disposed in the lower internal space of the vehicle platform 100.

Similarly to the first center member 115, the second center member 125 includes an outer second center member 125a and two inner second center members 125b. The outer second center member 125a supports the rear ends of the two upper second rotation actuators 124a and the two lower second rotation actuators 124b in a manner similar to that in which the outer first center member 115a supports the rear ends of the two upper first rotation actuators 114a and the two lower first rotation actuators 114b. The outer second center member 125a will thus not be described in further detail. The two inner second center members 125b support the front ends of the upper second rotation actuators 124a and the lower second rotation actuators 124b in a manner similar to that in which the two inner first center members 115b support the front ends of the upper first rotation actuators 114a and the lower first rotation actuators 114b. The two inner second center members 125b will thus not be described in further detail.

The first rotation actuator 114 and the second rotation actuator 124 are respectively held by the first center member 115 and the second center member 125 such that the front ends of the four piston rods of the first rotation actuator 114 face the front ends of the four piston rods of the second rotation actuator 124 in the X-axis direction. The intermediate member 116 is disposed between the first center member 115 and the second center member 125.

The intermediate member 116 receives the front ends of the four piston rods of the first rotation actuator 114 and the front ends of the four piston rods of the second rotation actuator 124, with each front end facing the associated front end in the X-axis direction. The intermediate member 116 is made of a metal material or a resin material and has a block shape. The first rotation actuator 114 and the second rotation actuator 124 are disposed such that the four piston rods of the first rotation actuator 114 and the four piston rods of the second rotation actuator 124 push each other through the intermediate member 116. The intermediate member 116 is supported by the first rotation actuator 114 and the second rotation actuator 124 at a central location in the vehicle platform 100 in the direction of travel.

The first wheel arms 117 connect the first wheel supporting member 110 to the first center member 115 and the second center member 125 such that the first wheel supporting member 110 is movable. The second wheel arms 127 connect the second wheel supporting member 120 to the first center member 115 and the second center member 125 such that the second wheel supporting member 120 is movable. With the first wheel arms 117 rotatably connected to the first center member 115 and the second center member 125, two of the first wheel arms 117 extend between the first center member 115 and the first front wheel 112F so as to support the first front wheel 112F, and the other two of the first wheel arms 117 extend between the second center member 125 and the first rear wheel 112R so as to support the first rear wheel 112R. With the second wheel arms 127 rotatably connected to the first center member 115 and the second center member 125, two of the second wheel arms 127 extend between the first center member 115 and the second front wheel 122F so as to support the second front wheel 122F, and the other two of the second wheel arms 127 extend between the second center member 125 and the second rear wheel 122R so as to support the second rear wheel 122R. The first wheel arms 117 and the second wheel arms 127 are each made of a metal material or a resin material. Because the first wheel arms 117 and the second wheel arms 127 are symmetric with respect to the center line LC extending in the X-axis direction (see FIGS. 2 and 3), the first wheel arms 117 will mainly be described. The first wheel arms 117 include two outer first wheel arms 117a and three sets of inner first wheel arms 117b.

The two outer first wheel arms 117a connect the first wheel supporting member 110 to the outer first center member 115a and the outer second center member 125a such that the first wheel supporting member 110 is movable. Each of the outer first wheel arms 117a is a plate extending in the Z-axis direction. One of the two outer first wheel arms 117a is disposed adjacent to the front surface of the vehicle platform 100, and the other one of the two outer first wheel arms 117a is disposed adjacent to the rear surface of the vehicle platform 100. One of the two outer first wheel arms 117a is rotatably connected through a hinge structure to the first wheel supporting member 110 and the outer first center member 115a, and the other one of the two outer first wheel arms 117a is rotatably connected through a hinge structure to the first wheel supporting member 110 and the outer second center member 125a. One of the two outer first wheel arms 117a is supported by the first supporting shaft 171 of the outer first center member 115a, and the other one of the two outer first wheel arms 117a is supported by the first supporting shaft 171 of the outer second center member 125a. The first supporting shafts 171 of the outer first center member 115a and the outer second center member 125a each extend vertically. The first supporting shafts 171 of the outer first center member 115a and the outer second center member 125a support the outer first wheel arms 117a such that the outer first wheel arms 117a are rotatable.

The three sets of inner first wheel arms 117b connect the first wheel supporting member 110 to the inner first center members 115b and the inner second center member 125b such that the first wheel supporting member 110 is movable. Each set of inner first wheel arms 117b includes two rods each extending on a plane defined by the X-axis and the Y-axis.

The three sets of inner first wheel arms 117b include a first set of inner first wheel arms 117b, a second set of inner first wheel arms 117b, and a third set of inner first wheel arms 117b. The first set of inner first wheel arms 117b is rotatably connected through a hinge structure to the upper inner first center member 115b (which supports the upper first rotation actuators 114a) and the first wheel supporting member 110. The first set of inner first wheel arms 117b is supported by the first supporting shaft 171 of the upper inner first center member 115b. The first supporting shaft 171 of the upper inner first center member 115b supports the first set of inner first wheel arms 117b such that the first set of inner first wheel arms 117b is rotatable. The second set of inner first wheel arms 117b is rotatably connected through a hinge structure to the lower inner first center member 115b (which supports the lower first rotation actuators 114b) and the first wheel supporting member 110.

The third set of inner first wheel arms 117b is rotatably connected through a hinge structure to the upper inner second center member 125b (which supports the upper second rotation actuators 124a) and the first wheel supporting member 110. The three sets of inner first wheel arms 117b are each inclined with respect to the X-axis direction in the plan view of the vehicle platform 100, with the first and second wheels 112 and 122 located farthest away from each other (see FIGS. 2 and 3).

No inner first wheel arms 117b are disposed between the lower inner second center member 125b (which supports the lower second rotation actuators 124b) and the first wheel supporting member 110. This aims to prevent physical interference with the first wheel drive motor 111. If such physical interference is preventable, the inner first wheel arms 117b may be disposed between the lower inner second center member 125b and the first wheel supporting member 110.

Similarly to the first wheel arms 117 described above, the second wheel arms 127 include two outer second wheel arms 127a and three sets of inner second wheel arms 127b. The two outer second wheel arms 127a are similar in structure to the two outer first wheel arms 117a described above, and the three sets of inner second wheel arms 127b are similar in structure to the three sets of inner first wheel arms 117b described above. The two outer second wheel arms 127a and the three sets of inner second wheel arms 127b will thus not be described in great detail. One of the two outer second wheel arms 127a is supported by the second supporting shaft 172 of the outer first center member 115a, and the other one of the two outer second wheel arms 127a is supported by the second supporting shaft 172 of the outer second center member 125a. The second supporting shafts 172 of the outer first center member 115a and the outer second center member 125a each extend vertically. The second supporting shafts 172 of the outer first center member 115a and the outer second center member 125a support the outer second wheel arms 127a such that the outer second wheel arms 127a are rotatable. The three sets of inner second wheel arms 127b are supported by the second supporting shaft 172 of the upper inner first center member 115b and the second supporting shafts 172 of the upper and lower inner second center members 125b. The second supporting shaft 172 of the upper inner first center member 115b and the second supporting shafts 172 of the upper and lower inner second center members 125b support the three sets of inner second wheel arms 127b such that the three sets of inner second wheel arms 127b are rotatable.

The controller 130 is a microcomputer including, for example, a central processing unit (CPU), a read-only memory (ROM), and a random-access memory (RAM). The controller 130 comprehensively controls overall operations of the vehicle platform 100 and overall operations of the self-propelled work vehicle. Specifically, in response to an instruction provided from an operating element 131, the controller 130 executes a control program stored in advance in a memory, such as a ROM. The controller 130 thus controls operations of the first wheel drive motor 111 and the second wheel drive motor 121 so as to cause the vehicle platform 100 to travel, stop, and turn.

The controller 130 executes the control program in response to an instruction from the operating element 131 so as to control operations of the first rotation actuator 114 and the second rotation actuator 124 such that the distance (or track width) between the first and second wheels 112 and 122 is increased or reduced. When on-board components mounted on the vehicle platform 100 include an electric machine, tool, or device, the controller 130 also controls operations of the electric machine, tool, or device.

The operating element 131 is an input device through which instructions from the operator who operates the self-propelled work vehicle are to be provided to the controller 130. Examples of the operating element 131 include a joystick, a toggle switch, a button, and a dial, which are to be manually operated by the operator. The operating element 131 is directly provided on the self-propelled work vehicle including the vehicle platform 100. Alternatively, the operating element 131 may be physically spaced away from the self-propelled work vehicle and independent of the self-propelled work vehicle. A wired or wireless connection is made between the controller 130 and the operating element 131. The vehicle platform 100 includes, for example, a battery to store electric power to be supplied to the first wheel drive motor 111, the second wheel drive motor 121, the first rotation actuator 114, the second rotation actuator 124, and the controller 130.

Operations of the vehicle platform 100 will now be described. As previously mentioned, the vehicle platform 100 is included in the self-propelled work vehicle that transports agricultural products, for example, on a farm or a plantation. The present preferred embodiment is thus based on the assumption that on-board components to be mounted on the vehicle platform 100 include a basket into which agricultural products are to be loaded, in which the agricultural products are to be stored, and from which the agricultural products are to be unloaded. With the vehicle platform 100 in its initial state, the distance (or track width) between the first and second wheels 112 and 122 is increased to maximum.

The operator first operates the operating element 131 so as to turn on the power of the controller 130, which activates the self-propelled work vehicle. The operator then operates the operating element 131 so as to provide an instruction for travel of the vehicle platform 100 to the controller 130. In response to this instruction, the controller 130 is able to drive the first wheel drive motor 111 and the second wheel drive motor 121 so as to cause the vehicle platform 100 to start traveling. In this case, in accordance with an operation performed on the operating element 131 by the operator, the controller 130 is able to suitably adjust the direction of rotation of each of the first wheel drive motor 111 and the second wheel drive motor 121 and/or the number of revolutions of each of the first wheel drive motor 111 and the second wheel drive motor 121 so as to cause the vehicle platform 100 to move forward, move rearward, make a right turn, or make a left turn.

For example, when the vehicle platform 100 is approaching a place where a road width is narrow, the operator is able to reduce the distance (or track width) between the first and second wheels 112 and 122. Specifically, the operator operates the operating element 131 so as to provide, to the controller 130, an instruction for reducing the distance (or track width) between the first and second wheels 112 and 122. In response to this instruction, the controller 130 drives the first rotation actuator 114 and the second rotation actuator 124. To be more specific, the controller 130 causes the first rotation actuator 114 and the second rotation actuator 124 to extend their piston rods.

The extension of the piston rods moves the first center member 115 and the second center member 125 away from the intermediate member 116, so that the first center member 115 and the second center member 125 move away from each other. The first wheel arms 117 and the second wheel arms 127 are rotatably connected to the first center member 115 and the second center member 125. The first wheel arms 117 are rotatably connected to the first wheel supporting member 110, and the second wheel arms 127 are rotatably connected to the second wheel supporting member 120. Accordingly, the first wheel supporting member 110 and the second wheel supporting member 120 simultaneously move toward the first center member 115 and the second center member 125 in accordance with the extension of the piston rods of the first rotation actuator 114 and the second rotation actuator 124.

The movement of the first and second wheel supporting members 110 and 120 toward the first and second center members 115 and 125 moves the first and second wheels 112 and 122 toward the center of the vehicle platform 100 in the vehicle width direction. Thus, as illustrated in FIG. 5, the first and second wheels 112 and 122 move toward each other, so that the distance (or track width) between the first and second wheels 112 and 122 is reduced. In this state, the first wheel drive motor 111 and the second wheel drive motor 121 are located closest to each other in the vehicle width direction and overlap with the center line LC in the plan view. Because the first center member 115 and the second center member 125 each move while keeping its orientation parallel or substantially parallel to the direction of travel of the vehicle platform 100, the two first wheels 112 and the two second wheels 122 each move while keeping its orientation.

The vehicle platform 100 further includes a first orientation keeper 181 (see FIG. 2). The first orientation keeper 181 includes the first wheel supporting member 110, the first center member 115, the second center member 125, the first supporting shafts 171, the intermediate member 116, and the first wheel arms 117. The first orientation keeper 181 moves the first wheels 112 in the vehicle width direction and keeps the orientations of the first wheels 112 with respect to the front-rear direction of the vehicle during the movement of the first wheels 112. In the present preferred embodiment, the first orientation keeper 181 further includes the first rotation actuator 114 and the second rotation actuator 124. The first rotation actuator 114 connects the outer first center member 115a to the inner first center members 115b such that the outer first center member 115a and the inner first center members 115b are integral with each other. The second rotation actuator 124 connects the outer second center member 125a to the inner second center members 125b such that the outer second center member 125a and the inner second center members 125b are integral with each other. A portion of the first wheel supporting member 110, two of the first wheel arms 117 (i.e., the first wheel arms 117 adjacent to the first front wheel 112F), the first center member 115, and the first rotation actuator 114 define a first parallel link mechanism. For example, when the two first wheel arms 117 of the first parallel link mechanism rotate clockwise by a predetermined angle in the plan view, the first orientation keeper 181 causes the first wheel supporting member 110 to rotate counterclockwise relative to the two first wheel arms 117 by the same angle and thus keeps the orientation of the first front wheel 112F disposed on the first wheel supporting member 110. A portion of the first wheel supporting member 110, the other two of the first wheel arms 117 (i.e., the first wheel arms 117 adjacent to the first rear wheel 112R), the second center member 125, and the second rotation actuator 124 define a second parallel link mechanism. For example, when the two first wheel arms 117 of the second parallel link mechanism rotate clockwise by a predetermined angle in the plan view, the first orientation keeper 181 causes the first wheel supporting member 110 to rotate counterclockwise relative to the two first wheel arms 117 by the same angle and thus keeps the orientation of the first rear wheel 112R disposed on the first wheel supporting member 110.

The vehicle platform 100 further includes a second orientation keeper 182 (see FIG. 2). The second orientation keeper 182 includes the second wheel supporting member 120, the first center member 115, the second center member 125, the second supporting shafts 172, the intermediate member 116, and the second wheel arms 127. The second orientation keeper 182 moves the second wheels 122 in the vehicle width direction and keeps the orientations of the second wheels 122 with respect to the front-rear direction of the vehicle during the movement of the second wheels 122. In the present preferred embodiment, the second orientation keeper 182 further includes the first rotation actuator 114 and the second rotation actuator 124. The first rotation actuator 114 connects the outer first center member 115a to the inner first center members 115b such that the outer first center member 115a and the inner first center members 115b are integral with each other. The second rotation actuator 124 connects the outer second center member 125a to the inner second center members 125b such that the outer second center member 125a and the inner second center members 125b are integral with each other. A portion of the second wheel supporting member 120, two of the second wheel arms 127 (i.e., the second wheel arms 127 adjacent to the second front wheel 122F), the first center member 115, and the first rotation actuator 114 define a third parallel link mechanism. For example, when the two second wheel arms 127 of the third parallel link mechanism rotate clockwise by a predetermined angle in the plan view, the second orientation keeper 182 causes the second wheel supporting member 120 to rotate counterclockwise relative to the two second wheel arms 127 by the same angle and thus keeps the orientation of the second front wheel 122F disposed on the second wheel supporting member 120. A portion of the second wheel supporting member 120, the other two of the second wheel arms 127 (i.e., the second wheel arms 127 adjacent to the second rear wheel 122R), the second center member 125, and the second rotation actuator 124 define a fourth parallel link mechanism. For example, when the two second wheel arms 127 of the fourth parallel link mechanism rotate clockwise by a predetermined angle in the plan view, the second orientation keeper 182 causes the second wheel supporting member 120 to rotate counterclockwise relative to the two second wheel arms 127 by the same angle and thus keeps the orientation of the second rear wheel 122R disposed on the second wheel supporting member 120. The first orientation keeper 181 and the second orientation keeper 182 are an example of a distance changer. Specifically, the first orientation keeper 181 and the second orientation keeper 182 are configured to change the distance (or track width) between the first and second wheels 112 and 122 in the vehicle width direction. The first orientation keeper 181 and the second orientation keeper 182 are configured to change the distance between the first and second wheels 112 and 122 by moving at least one of the first wheel supporting member 110 and the second wheel supporting member 120 toward or away from the other one of the first wheel supporting member 110 and the second wheel supporting member 120 in the vehicle width direction.

The first wheel drive motor 111 and the second wheel drive motor 121, which are respectively disposed on the inner surfaces of the first wheel supporting member 110 and the second wheel supporting member 120, are located at different positions in the X-axis direction such that the first wheel drive motor 111 and the second wheel drive motor 121 do not face each other in the Y-axis direction. Thus, if the first wheel supporting member 110 and the second wheel supporting member 120 are brought close to each other, the first wheel drive motor 111 and the second wheel drive motor 121 would not come into contact with each other.

Figure 8:
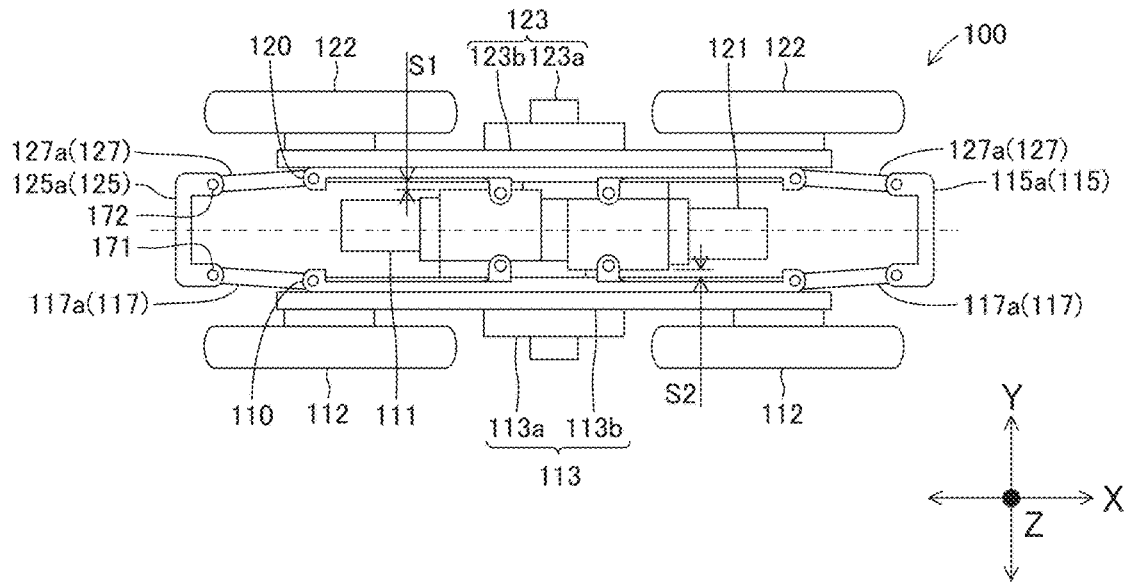
FIG. 8 is a schematic plan view of the vehicle platform illustrated in FIG. 5, with some of its components removed therefrom.

Accordingly, the controller 130 is able to move the first wheel supporting member 110 and the second wheel supporting member 120 to positions where the first wheel drive motor 111 and the second wheel drive motor 121 at least partially overlap with each other when the vehicle platform 100 is viewed in the front-rear direction (i.e., the X-axis direction). In the present preferred embodiment, as illustrated in FIG. 8, the controller 130 causes the first wheel supporting member 110 to move to a position where the first wheel drive motor 111 is located adjacent to the inner surface of the second wheel supporting member 120 with a slight gap S1 therebetween, and causes the second wheel supporting member 120 to move to a position where the second wheel drive motor 121 is located adjacent to the inner surface of the first wheel supporting member 110 with a slight gap S2 therebetween. Consequently, the first and second wheels 112 and 122 move toward the center of the vehicle platform 100 in the vehicle width direction and thus move toward each other, so that the distance (or track width) between the first and second wheels 112 and 122 is reduced.

To clarify the positional relationship between the first wheel drive motor 111 and the second wheel drive motor 121, some of the components of the vehicle platform 100 are not illustrated in FIG. 8. Among those not illustrated in FIG. 8 are the upper first rotation actuators 114a, the lower first rotation actuators 114b, the inner first center members 115b, the intermediate member 116, the inner first wheel arms 117b, the upper second rotation actuators 124a, the lower second rotation actuators 124b, the inner second center members 125b, and the inner second wheel arms 127b.

For example, when a road width is wide, the operator is able to operate the operating element 131 so as to provide, to the controller 130, an instruction for increasing the distance (or track width) between the first and second wheels 112 and 122. In this case, the controller 130 causes the first rotation actuator 114 and the second rotation actuator 124 to contract their piston rods.

The contraction of the piston rods moves the first center member 115 and the second center member 125 toward the intermediate member 116, so that the first center member 115 and the second center member 125 move toward each other. The first wheel supporting member 110 and the second wheel supporting member 120 thus simultaneously move away from the first center member 115 and the second center member 125 in accordance with the contraction of the piston rods of the first rotation actuator 114 and the second rotation actuator 124.

As a result, the first and second wheels 112 and 122 move outward in the vehicle width direction and thus move away from each other, so that the distance (or track width) between the first and second wheels 112 and 122 is increased. Because the first center member 115 and the second center member 125 each move while keeping its orientation parallel or substantially parallel to the direction of travel of the vehicle platform 100, the two first wheels 112 and the two second wheels 122 each move while keeping its orientation.

The controller 130 may increase or reduce the track width between the first and second wheels 112 and 122 only while the operating element 131 is operated by the operator. The controller 130 may increase or reduce the track width between the first and second wheels 112 and 122 by a predetermined distance each time the operating element 131 is operated by the operator. The operator may increase or reduce the track width between the first and second wheels 112 and 122 by operating the operating element 131 not only during travel of the vehicle platform 100 but also while the vehicle platform 100 is at rest.

As will be understood from the above description of the present preferred embodiment, the first wheel arms 117 connected to the first front wheel 112F rotate relative to the first center member 115, the first wheel arms 117 connected to the first rear wheel 112R rotate relative to the second center member 125, the second wheel arms 127 connected to the second front wheel 122F rotate relative to the first center member 115, and the second wheel arms 127 connected to the second rear wheel 122R rotate relative to the second center member 125. The rotation of the first wheel arms 117 and the second wheel arms 127 moves the first and second wheels 112 and 122 toward or away from the first center member 115 and the second center member 125. The vehicle platform 100 thus allows the vehicle to travel while the distance (or track width) between the first and second wheels 112 and 122 is reduced.

In the present preferred embodiment, the first wheel drive motor 111 and the second wheel drive motor 121 are respectively attached to the first wheel supporting member 110 and the second wheel supporting member 120 so as to be disposed at different positions in the front-rear direction of the vehicle (i.e., the direction of travel of the vehicle). The first wheel supporting member 110 and the second wheel supporting member 120 are movable toward each other such that the first wheel drive motor 111 and the second wheel drive motor 121 overlap with each other when the vehicle platform 100 is viewed in the front-rear direction. With the first wheel supporting member 110 and the second wheel supporting member 120 located farthest away from each other, the first wheel drive motor 111 and the second wheel drive motor 121 are disposed in a staggered arrangement. Thus, if the first wheel supporting member 110 and the second wheel supporting member 120 move toward each other, the first wheel drive motor 111 and the second wheel drive motor 121 would not come into contact with each other, making it possible to sufficiently change the distance (or track width) between the first and second wheels 112 and 122. The first orientation keeper 181 and the second orientation keeper 182 are preferably able to move the first wheel supporting member 110 and the second wheel supporting member 120 toward each other such that the first wheel drive motor 111 and the second wheel drive motor 121 are at least partially located at corresponding positions in the vehicle width direction when viewed from a position in front of the vehicle.

The present invention is not limited to the first preferred embodiment described above but various changes may be made to the first preferred embodiment without departing from the scope of the present invention. In variations described below, elements similar to those of the vehicle platform 100 according to the first preferred embodiment are identified by the same reference signs and will thus not be described.

In the first preferred embodiment, the first wheel supporting member 110 has the two first wheels 112 attached thereto. Alternatively, the first wheel supporting member 110 may have at least one first wheel 112 attached thereto. Similarly to the first wheel supporting member 110, the second wheel supporting member 120 may have at least one second wheel 122 attached thereto.

In the first preferred embodiment, the first driving force transmitter 113 is configured to drive the two first wheels 112. Alternatively, the first driving force transmitter 113 may drive at least one of the first wheels 112. Accordingly, the first driving force transmitter 113 may transmit a driving force to an associated one of the two first wheels 112 so as to drive the associated first wheel 112. Similarly to the first driving force transmitter 113, the second driving force transmitter 123 may transmit a driving force to an associated one of the two second wheels 122 so as to drive the associated second wheel 122.

In the first preferred embodiment, the first center member 115 includes the outer first center member 115a and the inner first center members 115b. The first center member 115, however, is preferably between the first and second wheels 112 and 122 and supported by the first and second wheels 112 and 122. Accordingly, the first center member 115 may include at least one of the outer first center member 115a and the inner first center members 115b. The vehicle platform 100 does not necessarily have to be provided with both of the upper and lower inner first center members 115b. Alternatively, the vehicle platform 100 may be provided with either one of the upper and lower inner first center members 115b. Similarly to the first center member 115, the second center member 125 may include at least one of the outer second center member 125a and the inner second center members 125b.

Figure 9:
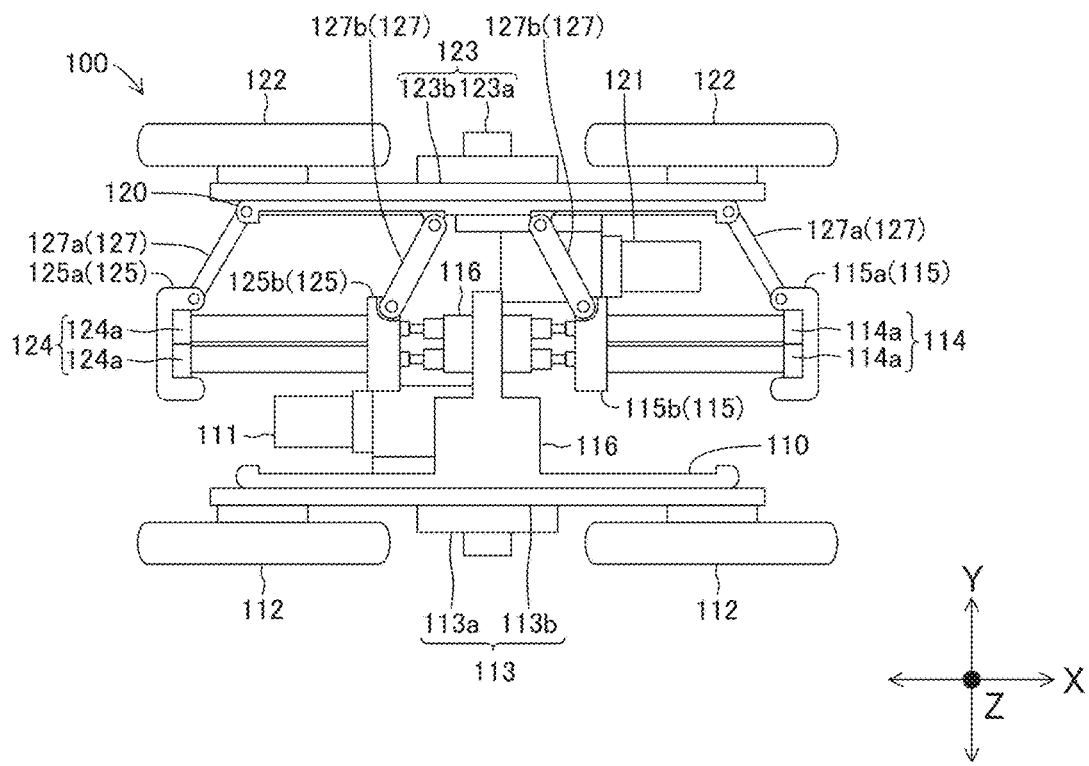
FIG. 9 is a schematic plan view of the external appearance of a vehicle platform according to a first variation of the first preferred embodiment of the present invention.

In the first preferred embodiment, the vehicle platform 100 is configured to move the first wheels 112 and the second wheels 122 in the vehicle width direction in a reciprocating manner. Alternatively, the vehicle platform 100 may be configured to move either the first wheels 112 or the second wheels 122 in the vehicle width direction in a reciprocating manner. As illustrated in FIG. 9, the vehicle platform 100 according to a first variation of the first preferred embodiment is configured such that the intermediate member 116 is integral with the first wheel supporting member 110 and no first wheel arms 117 are provided. Thus, in response to extension and contraction of the piston rods of the first rotation actuator 114 and the second rotation actuator 124, the vehicle platform 100 is able to move the second wheel supporting member 120 in the vehicle width direction in a reciprocating manner and thus move the second wheels 122 in the vehicle width direction in a reciprocating manner. In this variation, the first rotation actuator 114 rotates the associated second wheel arms 127 and substantially functions as the second rotation actuator 124, but both of the first rotation actuator 114 and the second rotation actuator 124 are illustrated in FIG. 9 for the sake of convenience of description.

Figure 10:
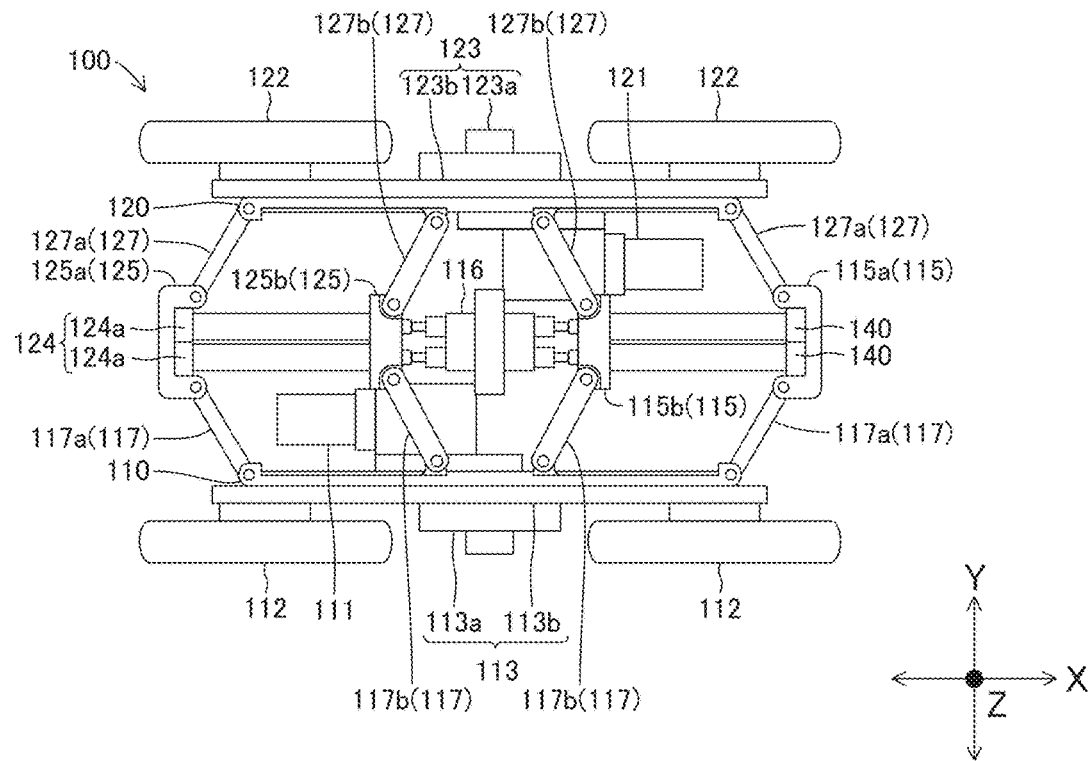
FIG. 10 is a schematic plan view of the external appearance of a vehicle platform according to a second variation of the first preferred embodiment of the present invention.

In the first preferred embodiment, the vehicle platform 100 is configured such that the first wheel supporting member 110 and the second wheel supporting member 120 are moved in the vehicle width direction in a reciprocating manner by the first rotation actuator 114 and the second rotation actuator 124. Alternatively, the vehicle platform 100 may be configured such that the first wheel supporting member 110 and the second wheel supporting member 120 are moved in the vehicle width direction in a reciprocating manner by either one of the first rotation actuator 114 and the second rotation actuator 124. As illustrated in FIG. 10, the vehicle platform 100 according to a second variation of the first preferred embodiment includes piston cylinders 140 instead of the first rotation actuator 114. The piston cylinders 140 each include a piston, a cylinder, and a piston rod fitted to the piston such that the piston rod is freely slidable within the cylinder. Thus, in response to extension and contraction of the piston rods of the piston cylinders 140 and the second rotation actuator 124, the vehicle platform 100 according to the second variation of the first preferred embodiment is able to move the first wheel supporting member 110 and the second wheel supporting member 120 in the vehicle width direction in a reciprocating manner and thus move the first wheels 112 and the second wheels 122 in the vehicle width direction in a reciprocating manner.

In the first preferred embodiment, the first rotation actuator 114 and the second rotation actuator 124 each include four electric linear motion cylinders, for example. The first rotation actuator 114 and the second rotation actuator 124, however, each preferably include at least one electric linear motion cylinder. The first rotation actuator 114 and the second rotation actuator 124 may each include any component(s) other than electric linear motion cylinder(s). The first rotation actuator 114 and the second rotation actuator 124 may each include any of various components, such as a hydraulic cylinder, a pneumatic cylinder, and a feed screw mechanism.

In the first preferred embodiment, the first wheel drive motor 111 is attached to the inner surface of the first wheel supporting member 110. Alternatively, the first wheel drive motor 111 may be attached to the outer surface of the first wheel supporting member 110. The vehicle platform 100 may have an "in-wheel motor structure" in which the first wheel drive motor 111 is housed in one of the first wheels 112. Similarly to the first wheel drive motor 111, the second wheel drive motor 121 may be attached to the outer surface of the second wheel supporting member 120 or may be housed in one of the second wheels 122.

In the first preferred embodiment, the first wheel drive motor 111 and the second wheel drive motor 121 are respectively attached to the inner surfaces of the first wheel supporting member 110 and the second wheel supporting member 120 such that the first wheel drive motor 111 and the second wheel drive motor 121 are located at different positions in the X-axis direction and thus do not face each other in the vehicle width direction. Accordingly, the vehicle platform 100 is able to further reduce the distance (or track width) between the first and second wheels 112 and 122 while preventing the first wheel drive motor 111 and the second wheel drive motor 121 from physically interfering with each other. Alternatively, the first wheel drive motor 111 and the second wheel drive motor 121 may be respectively attached to the inner surfaces of the first wheel supporting member 110 and the second wheel supporting member 120 such that the first wheel drive motor 111 and the second wheel drive motor 121 are located at corresponding positions in the X-axis direction and thus face each other in the vehicle width direction. Optionally, one of the first wheel drive motor 111 and the second wheel drive motor 121 may be disposed on the inner surface of the first wheel supporting member 110 or the second wheel supporting member 120, and the other one of the first wheel drive motor 111 and the second wheel drive motor 121 may be disposed on the outer surface of the first wheel supporting member 110 or the second wheel supporting member 120.

Figure 11:
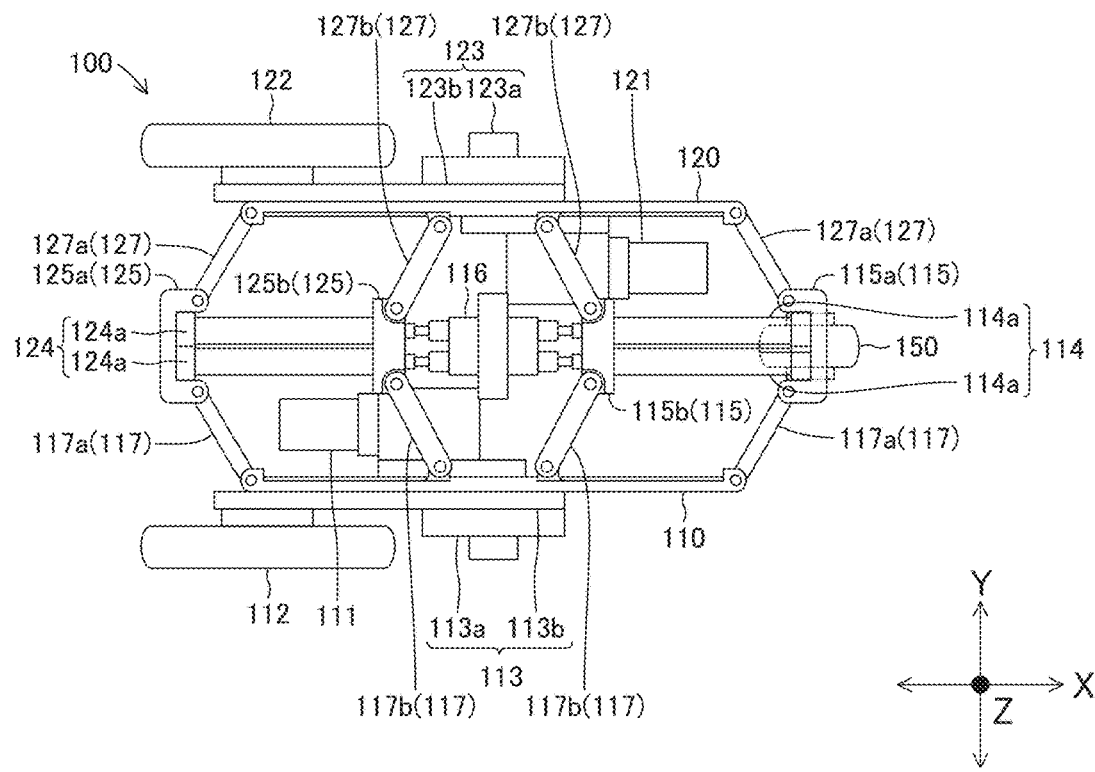
FIG. 11 is a schematic plan view of the external appearance of a vehicle platform according to a third variation of the first preferred embodiment of the present invention.

In the first preferred embodiment, the vehicle platform 100 is a four-wheel platform including four wheels, i.e., the two first wheels 112 and the two second wheels 122. The vehicle platform 100, however, preferably includes at least a pair of right and left wheels, one of which is the first wheel 112 and the other one of which is the second wheel 122. As illustrated in FIG. 11, the vehicle platform 100 according to a third variation of the first preferred embodiment is a three-wheel platform including the first wheel 112 attached to the first wheel supporting member 110, the second wheel 122 attached to the second wheel supporting member 120, and a third wheel 150 attached to the lower end of the outer first center member 115a.

In the first preferred embodiment, the controller 130 causes the first wheel supporting member 110 to move to a position where the first wheel drive motor 111 is located adjacent to the inner surface of the second wheel supporting member 120 with the slight gap S1 therebetween, and causes the second wheel supporting member 120 to move to a position where the second wheel drive motor 121 is located adjacent to the inner surface of the first wheel supporting member 110 with the slight gap S2 therebetween. The gap S1 and the gap S2 may be equal in size or may be different in size. The controller 130 preferably is configured or programmed to cause the first wheel supporting member 110 and the second wheel supporting member 120 to move to positions where the first wheel drive motor 111 and the second wheel drive motor 121 at least partially overlap with each other when the vehicle platform 100 is viewed in the front-rear direction.

Figure 12:
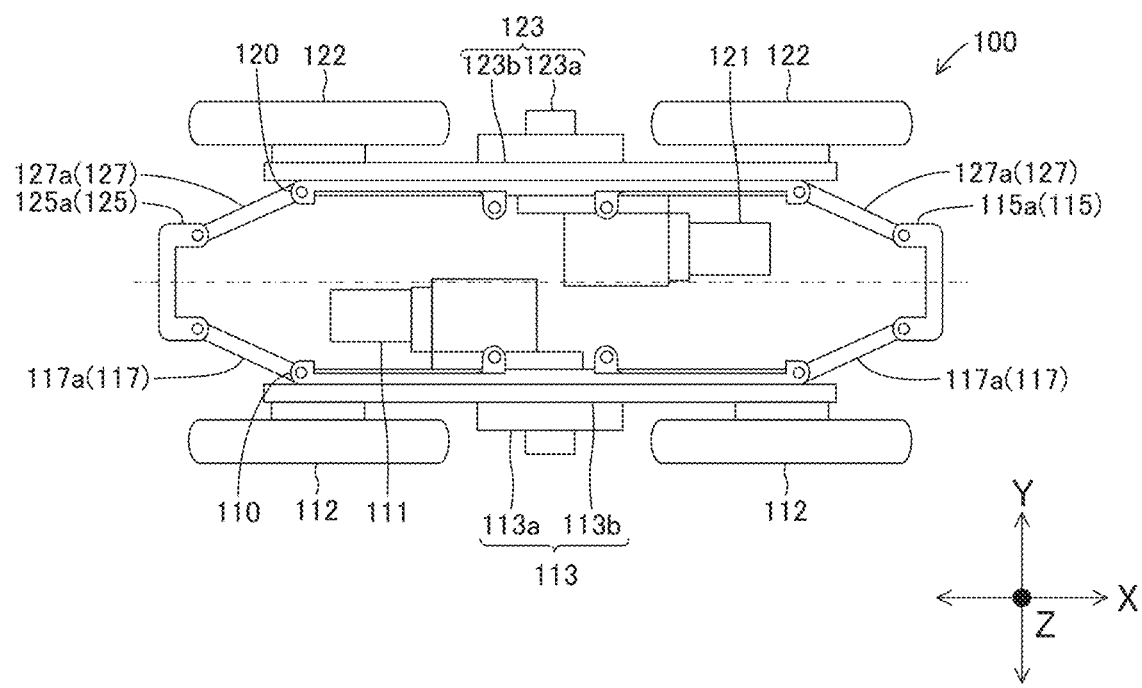
FIG. 12 is a schematic plan view of the external appearance of a vehicle platform according to a fourth variation of the first preferred embodiment of the present invention.

The controller 130 may cause the first wheel supporting member 110 to move to a position where the first wheel drive motor 111 comes into contact with the inner surface of the second wheel supporting member 120, and may cause the second wheel supporting member 120 to move to a position where the second wheel drive motor 121 comes into contact with the inner surface of the first wheel supporting member 110. As illustrated in FIG. 12, the controller 130 of the vehicle platform 100 according to a fourth variation of the first preferred embodiment causes the first wheel supporting member 110 and the second wheel supporting member 120 to move such that an end of the first wheel drive motor 111 facing the second wheel supporting member 120 and an end of the second wheel drive motor 121 facing the first wheel supporting member 110 slightly overlap with each other when viewed in the front-rear direction of the vehicle platform 100.

In the first preferred embodiment, the vehicle platform 100 includes the first wheel drive motor 111 and the second wheel drive motor 121 positioned at equal or substantially equal heights. The vehicle platform 100 is thus able to improve the running stability of the self-propelled work vehicle. Alternatively, the vehicle platform 100 may include the first wheel drive motor 111 and the second wheel drive motor 121 positioned at different heights.

In the first preferred embodiment, the vehicle platform 100 includes the first wheel drive motor 111 and the second wheel drive motor 121 disposed at different positions in the front-rear direction of the vehicle. Accordingly, the vehicle platform 100 is prevented from increasing in height and is thus able to improve the running stability of the self-propelled work vehicle. The vehicle platform 100, however, preferably includes the first wheel drive motor 111 and the second wheel drive motor 121 located at different positions in at least either the front-rear direction of the vehicle platform 100 or the up-down direction of the vehicle platform 100.

Figure 13A:
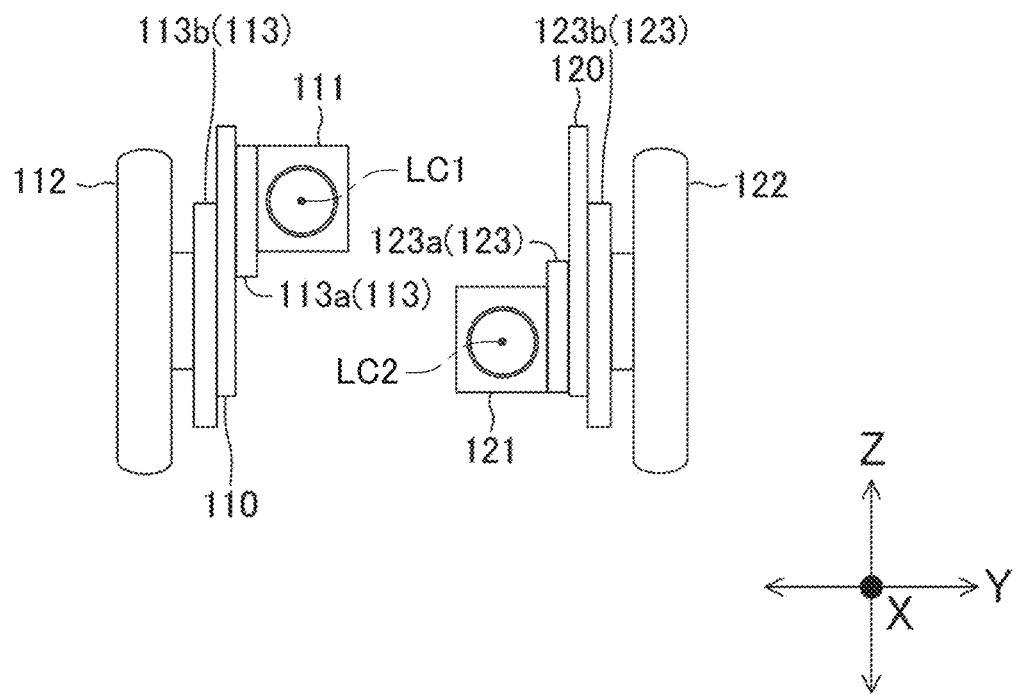
FIG. 13A is a schematic front view of a vehicle platform according to a fifth variation of the first preferred embodiment of the present invention, with its track width increased.
Figure 13B:
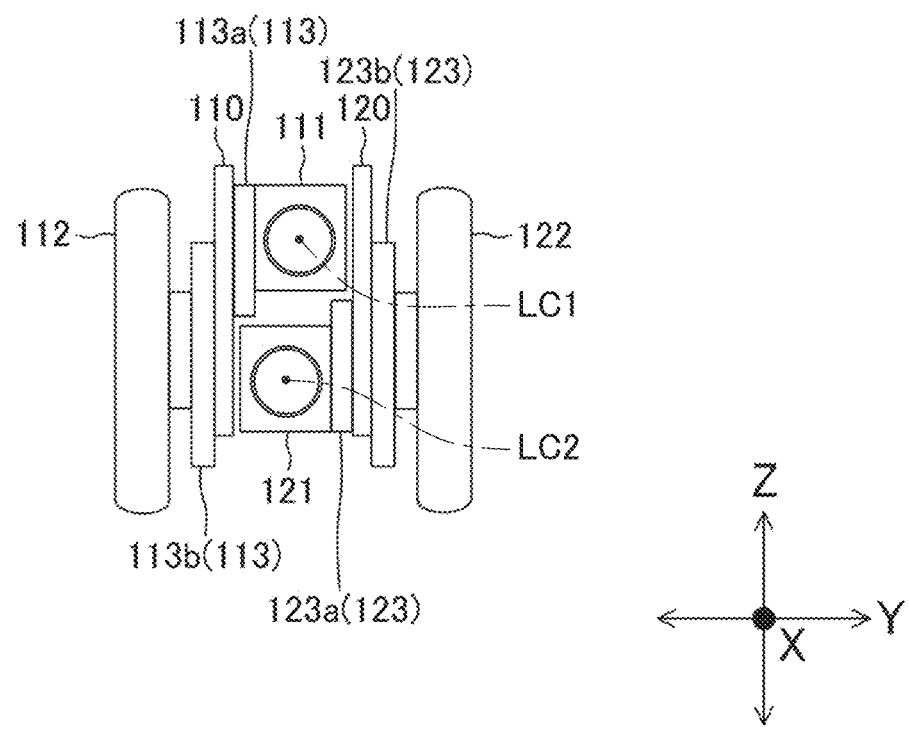
FIG. 13B is a schematic front view of the vehicle platform according to the fifth variation of the first preferred embodiment of the present invention, with its track width reduced.

As illustrated in FIGS. 13A and 13B, the vehicle platform 100 according to a fifth variation of the first preferred embodiment includes the first wheel drive motor 111 and the second wheel drive motor 121 disposed at different positions in the up-down direction of the vehicle. To clarify the positional relationship between the first wheel drive motor 111 and the second wheel drive motor 121, FIGS. 13A and 13B each illustrate only the first wheel supporting member 110, the first wheel drive motor 111, one of the first wheels 112, the first driving force transmitter 113 (which includes the speed reduction mechanism 113a and the belt transmission mechanism 113b), the second wheel supporting member 120, the second wheel drive motor 121, one of the second wheels 122, and the second driving force transmitter 123 (which includes the speed reduction mechanism 123a and the belt transmission mechanism 123b).

In the first preferred embodiment, the vehicle platform 100 is configured such that with the first and second wheels 112 and 122 located closest to each other in the vehicle width direction, the first wheel drive motor 111 and the second wheel drive motor 121 are located adjacent to each other in the central region of the vehicle platform 100 in the front-rear direction. This facilitates placing the center of gravity of the vehicle platform 100 at or around the center of the vehicle platform 100 in its front-rear direction and its width direction, resulting in an improvement in the running stability of the vehicle platform 100. Alternatively, the vehicle platform 100 may be configured such that with the first and second wheels 112 and 122 located closest to each other in the vehicle width direction, the first wheel drive motor 111 and the second wheel drive motor 121 are spaced away from each other in the front-rear direction or the up-down direction of the vehicle.

Second Preferred Embodiment

A vehicle platform 200 according to a second preferred embodiment of the present invention will now be described with reference to FIGS. 14 to 17. In the following description of the second preferred embodiment, elements different from those in the first preferred embodiment will mainly be discussed, and elements similar to those in the first preferred embodiment will not be discussed or will be discussed briefly.

Figure 14:
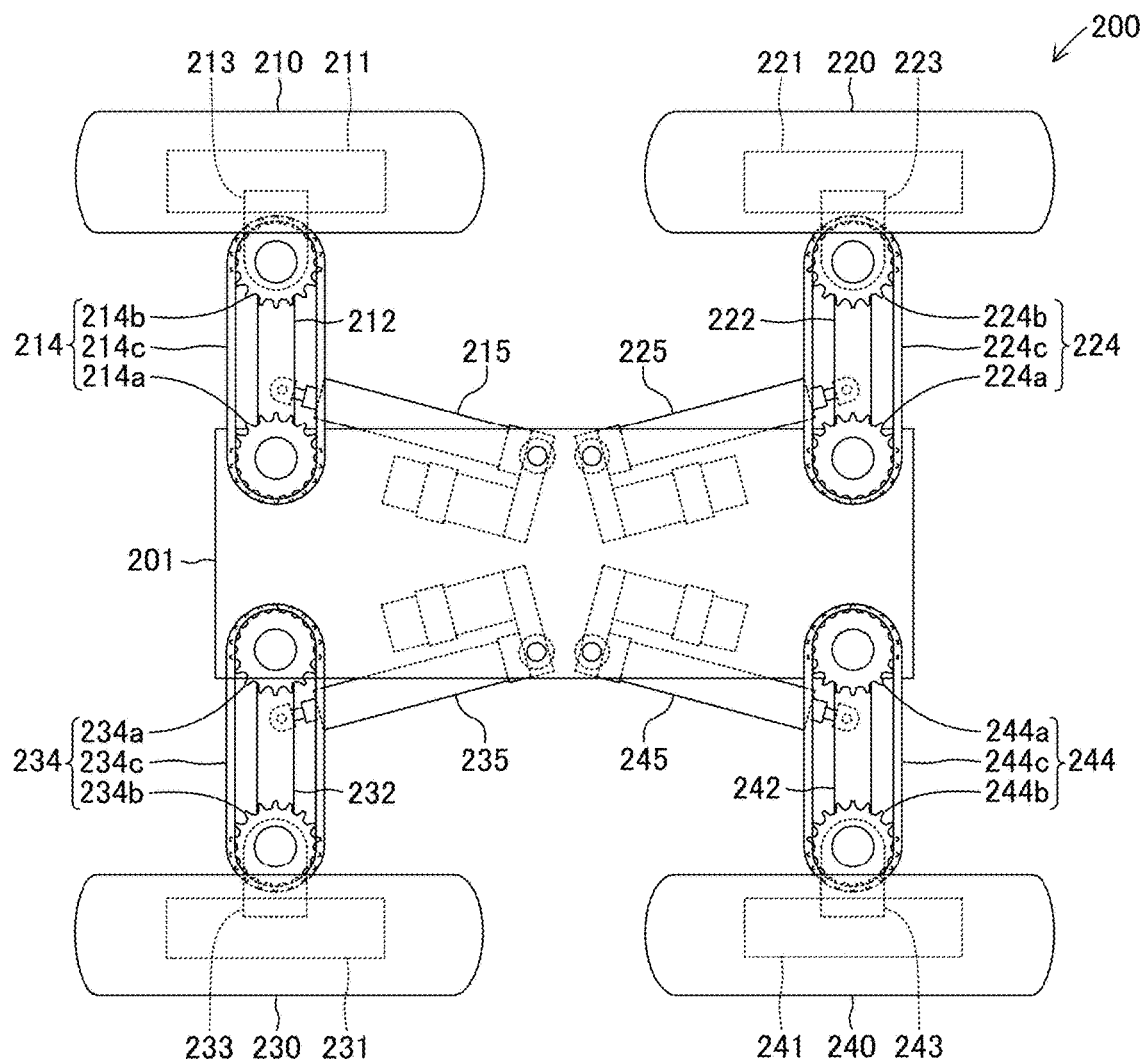
FIG. 14 is a schematic plan view of the external appearance of a vehicle platform according to a second preferred embodiment of the present invention.
Figure 14:
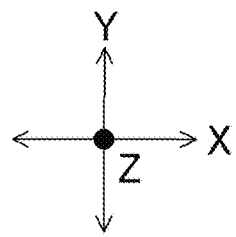
Figure 15:
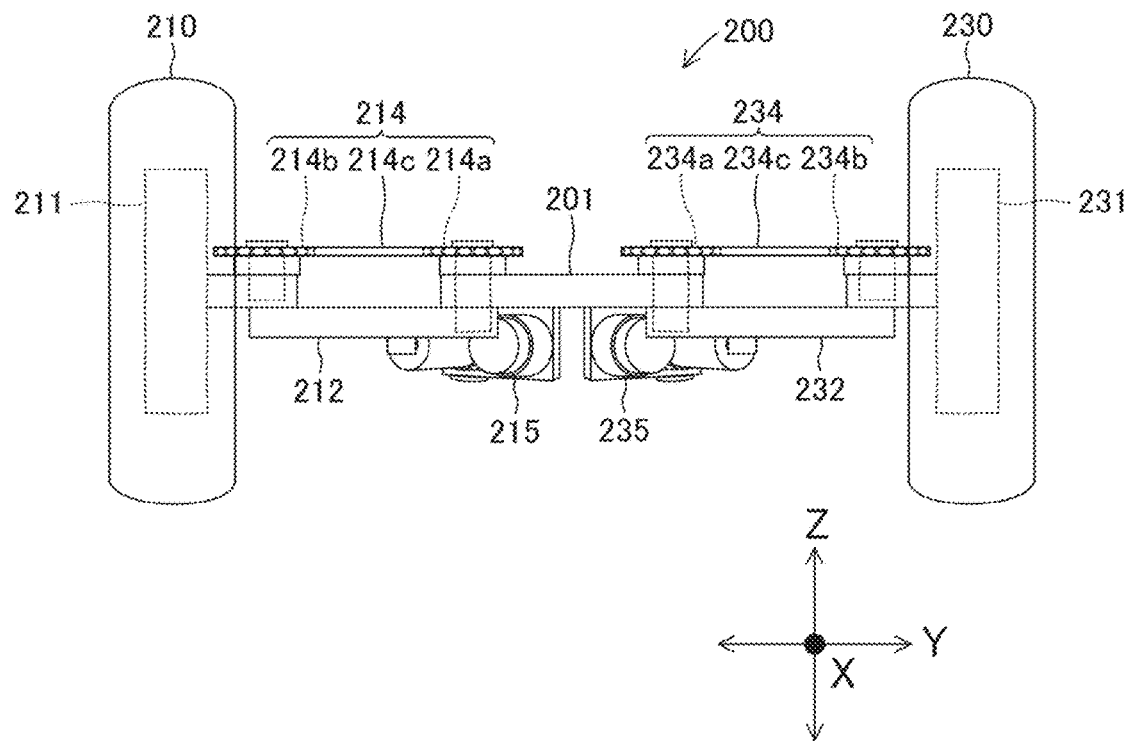
FIG. 15 is a schematic front view of the external appearance of the vehicle platform illustrated in FIG. 14.

As illustrated in FIG. 14, the vehicle platform 200 includes a center member 201 (center body). The center member 201 is disposed between first wheels 210 and 220 and second wheels 230 and 240. The center member 201 is supported by the first wheel 210 through a first wheel arm 212, supported by the first wheel 220 through a first wheel arm 222, supported by the second wheel 230 through a second wheel arm 232, and supported by the second wheel 240 through a second wheel arm 242.

The center member 201 supports first rotation actuators 215 and 225 and second rotation actuators 235 and 245. On-board components (examples of which include a carrier, a machine, a tool, and a device) to enable the vehicle platform 200 to function as a self-propelled work vehicle are attached to the center member 201. The center member 201 is made of a metal material or a resin material. The center member 201 has a flat plate shape extending on a plane defined by an X-axis and a Y-axis.

The first wheel 210 and the second wheel 230 are provided in a pair and roll on a road surface so as to move the vehicle platform 200 forward or rearward. The first wheel 210 and the second wheel 230 are each made of metal and each have a rubber tire attached to its rim. The first wheel 210 is internally provided with a first wheel drive motor 211. The first wheel drive motor 211 is an electric motor to rotate the first wheel 210. In other words, the first wheel 210 includes an "in-wheel motor". The second wheel 230 is internally provided with a second wheel drive motor 231. The second wheel drive motor 231 is an electric motor to rotate the second wheel 230. In other words, the second wheel 230 includes an "in-wheel motor". Operations of the first wheel drive motor 211 and the second wheel drive motor 231 are controlled by a controller 250.

The first wheel arm 212 connects a first wheel supporting member 213 (first wheel support) to the center member 201 such that the first wheel supporting member 213 is movable. The first wheel arm 212 is made of a metal material or a resin material. The first wheel arm 212 has an elongated plate shape. The first wheel arm 212 is rotatably connected at its first end to the lower surface of the center member 201 and rotatably connected at its second end to the lower surface of the first wheel supporting member 213.

The first wheel supporting member 213 connects the first wheel 210 to the first wheel arm 212. The first wheel supporting member 213 is a metal or resin component. The first wheel supporting member 213 has an elongated block shape extending along the axis of rotation of the first wheel 210 from the center of the first wheel 210. The first wheel supporting member 213 is assembled to the first wheel 210 so as to be integral therewith.

As illustrated in FIG. 14, a first orientation keeper 214 is disposed between the first end of the first wheel arm 212 and the first wheel supporting member 213. The first orientation keeper 214 keeps the orientation of the first wheel 210 in the direction of travel of the vehicle platform 200 (i.e., an X-axis direction). The first orientation keeper 214 includes a body-side gear 214a, a wheel-side gear 214b, and a chain 214c.

The body-side gear 214a passes through the center member 201 and is attached to the first end of the first wheel arm 212 so as to be integral therewith such that the body-side gear 214a rotates together with the first wheel arm 212. The wheel-side gear 214b is attached to the first wheel supporting member 213 so as to be integral therewith. The chain 214c is an annular component made of a metal material. The chain 214c is placed between the body-side gear 214a and the wheel-side gear 214b such that rotation of the body-side gear 214a is transmitted to the wheel-side gear 214b.

The first orientation keeper 214 is configured such that the body-side gear 214a rotates together with the first wheel arm 212 and the wheel-side gear 214b rotates relative to the first wheel arm 212. The rotation of the first wheel arm 212 thus rotates the body-side gear 214a. Accordingly, the first orientation keeper 214 keeps the orientation of the first wheel 210 in the direction of travel of the vehicle platform 200 (i.e., the X-axis direction) at all times. The number of teeth of the body-side gear 214a and the number of teeth of the wheel-side gear 214b are each set such that the first orientation keeper 214 would keep the orientation of the first wheel 210 in the direction of travel of the vehicle platform 200 (i.e., the X-axis direction) at all times if the angle of rotation of the first wheel arm 212 changes.

The first rotation actuator 215 is a driving source to generate a driving force for moving the first wheel 210 in a vehicle width direction in a reciprocating manner. Specifically, the first rotation actuator 215 includes an electric linear motion cylinder including a piston rod that makes a linear motion within the cylinder in response to being driven by an electric motor. A first end of the piston rod is connected to the first wheel arm 212 and a second end of the piston rod is connected to the lower surface of the center member 201 such that the first rotation actuator 215 is rotatable. Operations of the first rotation actuator 215 are controlled by the controller 250.

The vehicle platform 200 includes the first wheel 220 disposed in alignment with the first wheel 210 in the X-axis direction. The first wheel 220 serves as a front wheel or a rear wheel in accordance with the direction of travel of the vehicle platform 200. The first wheel 220 functions similarly to the first wheel 210 because the vehicle platform 200 includes a first wheel drive motor 221, the first wheel arm 222, a first wheel supporting member 223 (first wheel support), a first orientation keeper 224 (which includes a body-side gear 224a, a wheel-side gear 224b, and a chain 224c), and the first rotation actuator 225, which are respectively similar to the first wheel drive motor 211, the first wheel arm 212, the first wheel supporting member 213, the first orientation keeper 214 (which includes the body-side gear 214a, the wheel-side gear 214b, and the chain 214c), and the first rotation actuator 215.

Figure 17:
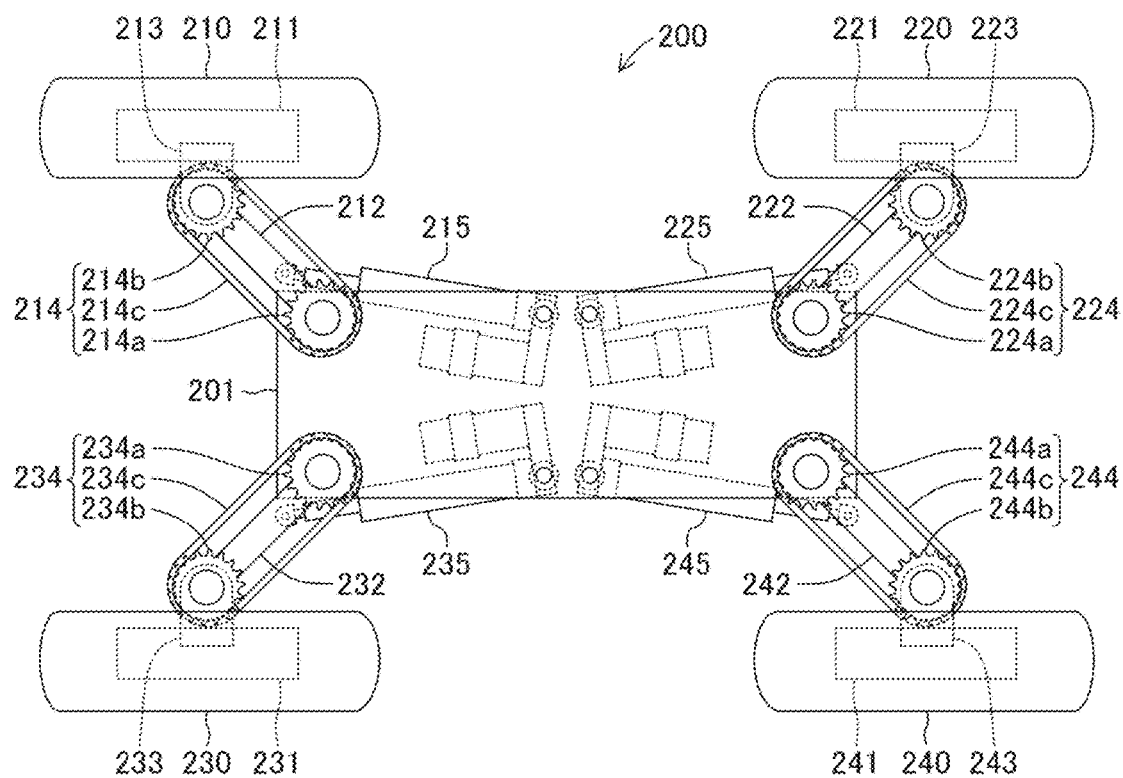
FIG. 17 is a schematic plan view of the external appearance of the vehicle platform illustrated in FIG. 14, with its track width reduced.

The first wheel 220, the first wheel drive motor 221, the first wheel arm 222, the first wheel supporting member 223, the first orientation keeper 224 (which includes the body-side gear 224a, the wheel-side gear 224b, and the chain 224c), and the first rotation actuator 225 are respectively mirror images of the first wheel 210, the first wheel drive motor 211, the first wheel arm 212, the first wheel supporting member 213, the first orientation keeper 214 (which includes the body-side gear 214a, the wheel-side gear 214b, and the chain 214c), and the first rotation actuator 215 with respect to a plane extending in a Y-axis direction and passing through the center of the vehicle platform 200 (see FIGS. 14 and 17). For example, when the first wheel arm 212 rotates counterclockwise by a predetermined angle in a plan view, the first orientation keeper 214 causes the first wheel 210 to rotate clockwise relative to the first wheel arm 212 by the same angle and thus keeps the orientation of the first wheel 210. For example, when the first wheel arm 222 rotates counterclockwise by a predetermined angle in the plan view, the first orientation keeper 224 causes the first wheel 220 to rotate clockwise relative to the first wheel arm 222 by the same angle and thus keeps the orientation of the first wheel 220.

The vehicle platform 200 includes the second wheels 230 and 240, which are respectively mirror images of the first wheels 210 and 220 with respect to a plane extending in the X-axis direction and passing through the center of the vehicle platform 200 (see FIGS. 14 and 17). The second wheel 230 pairs up with the first wheel 210, and the second wheel 240 pairs up with the first wheel 220. Specifically, the second wheel 230 functions similarly to the first wheel 210 because the vehicle platform 200 includes the second wheel drive motor 231, the second wheel arm 232, a second wheel supporting member 233 (second wheel support), a second orientation keeper 234 (which includes a body-side gear 234a, a wheel-side gear 234b, and a chain 234c), and the second rotation actuator 235, which are respectively similar to the first wheel drive motor 211, the first wheel arm 212, the first wheel supporting member 213, the first orientation keeper 214 (which includes the body-side gear 214a, the wheel-side gear 214b, and the chain 214c), and the first rotation actuator 215.

The second wheel 230, the second wheel drive motor 231, the second wheel arm 232, the second wheel supporting member 233, the second orientation keeper 234 (which includes the body-side gear 234a, the wheel-side gear 234b, and the chain 234c), and the second rotation actuator 235 are respectively mirror images of the first wheel 210, the first wheel drive motor 211, the first wheel arm 212, the first wheel supporting member 213, the first orientation keeper 214 (which includes the body-side gear 214a, the wheel-side gear 214b, and the chain 214c), and the first rotation actuator 215 with respect to the plane extending in the X-axis direction and passing through the center of the vehicle platform 200 (see FIGS. 14 and 17).

The second wheel 240 functions similarly to the first wheel 220 because the vehicle platform 200 includes a second wheel drive motor 241, the second wheel arm 242, a second wheel supporting member 243 (second wheel support), a second orientation keeper 244 (which includes a body-side gear 244a, a wheel-side gear 244b, and a chain 244c), and the second rotation actuator 245, which are respectively similar to the first wheel drive motor 221, the first wheel arm 222, the first wheel supporting member 223, the first orientation keeper 224 (which includes the body-side gear 224a, the wheel-side gear 224b, and the chain 224c), and the first rotation actuator 225.

The second wheel 240, the second wheel drive motor 241, the second wheel arm 242, the second wheel supporting member 243, the second orientation keeper 244 (which includes the body-side gear 244a, the wheel-side gear 244b, and the chain 244c), and the second rotation actuator 245 are respectively mirror images of the first wheel 220, the first wheel drive motor 221, the first wheel arm 222, the first wheel supporting member 223, the first orientation keeper 224 (which includes the body-side gear 224a, the wheel-side gear 224b, and the chain 224c), and the first rotation actuator 225 with respect to the plane extending in the X-axis direction and passing through the center of the vehicle platform 200 (see FIGS. 14 and 17). For example, when the second wheel arm 232 rotates counterclockwise by a predetermined angle in the plan view, the second orientation keeper 234 causes the second wheel 230 to rotate clockwise relative to the second wheel arm 232 by the same angle and thus keeps the orientation of the second wheel 230. For example, when the second wheel arm 242 rotates counterclockwise by a predetermined angle in the plan view, the second orientation keeper 244 causes the second wheel 240 to rotate clockwise relative to the second wheel arm 242 by the same angle and thus keeps the orientation of the second wheel 240.

Figure 16:
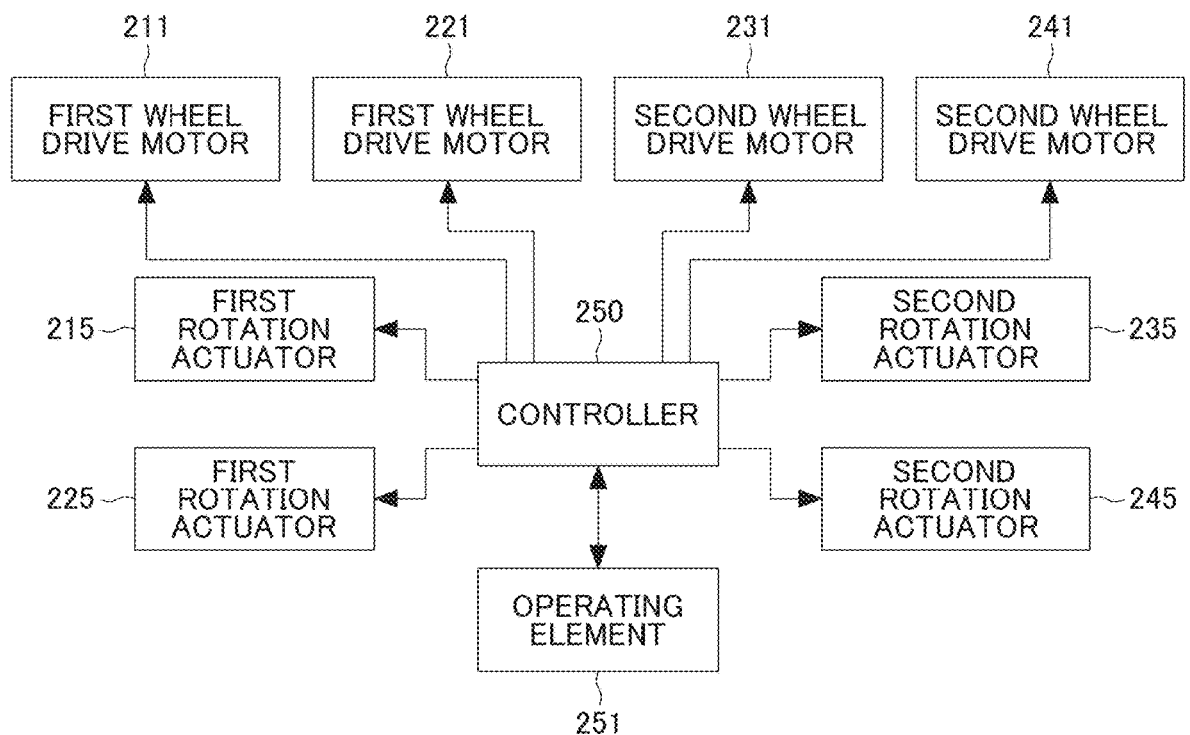
FIG. 16 is a schematic block diagram of a control system for the vehicle platform illustrated in FIG. 14.

The controller 250 is a microcomputer including, for example, a central processing unit (CPU), a read-only memory (ROM), and a random-access memory (RAM). The controller 250 comprehensively controls overall operations of the vehicle platform 200 and overall operations of the self-propelled work vehicle. Specifically, as illustrated in FIG. 16, the controller 250 executes a control program stored in advance in a memory, such as a ROM, in response to an instruction provided from an operating element 251. The controller 250 thus controls operations of the first wheel drive motors 211 and 221 and the second wheel drive motors 231 and 241 so as to cause the vehicle platform 200 to travel, stop, and turn.

The controller 250 executes the control program in response to an instruction from the operating element 251 so as to control operations of the first rotation actuators 215 and 225 and the second rotation actuators 235 and 245 such that the distance (or track width) between the first wheels 210 and 220 and the second wheels 230 and 240 is increased or reduced. When on-board components mounted on the vehicle platform 200 include an electric machine, tool, or device, the controller 250 also controls operations of the electric machine, tool, or device.

The operating element 251 is similar to the operating element 131 in the first preferred embodiment and will thus not be described in further detail. The vehicle platform 200 includes, for example, a battery to store electric power to be supplied to the first wheel drive motors 211 and 221, the second wheel drive motors 231 and 241, the first rotation actuators 215 and 225, the second rotation actuators 235 and 245, and the controller 250.

Operations of the vehicle platform 200 will now be described. Similarly to the vehicle platform 100, the vehicle platform 200 is included in the self-propelled work vehicle that transports agricultural products, for example, on a farm or a plantation. The present preferred embodiment is thus based on the assumption that on-board components to be mounted on the vehicle platform 200 include a basket into which agricultural products are to be loaded, in which the agricultural products are to be stored, and from which the agricultural products are to be unloaded. With the vehicle platform 200 in its initial state, the distance (or track width) between the first wheels 210 and 220 and the second wheels 230 and 240 is increased to maximum.

The operator first operates the operating element 251 so as to turn on the power of the controller 250, which activates the self-propelled work vehicle. The operator then operates the operating element 251 so as to provide an instruction for travel of the vehicle platform 200 to the controller 250. In response to this instruction, the controller 250 is able to drive the first wheel drive motors 211 and 221 and the second wheel drive motors 231 and 241 so as to cause the vehicle platform 200 to start traveling. In this case, in accordance with an operation performed on the operating element 251 by the operator, the controller 250 is able to suitably adjust the direction of rotation of each of the first wheel drive motors 211 and 221 and the second wheel drive motors 231 and 241 and/or the number of revolutions of each of the first wheel drive motors 211 and 221 and the second wheel drive motors 231 and 241 so as to cause the vehicle platform 200 to move forward, move rearward, make a right turn, or make a left turn.

For example, when the vehicle platform 200 is approaching a place where a road width is narrow, the operator is able to reduce the distance (or track width) between the first wheels 210 and 220 and the second wheels 230 and 240. Specifically, the operator operates the operating element 251 so as to provide, to the controller 250, an instruction for reducing the distance (or track width) between the first wheels 210 and 220 and the second wheels 230 and 240. In response to this instruction, the controller 250 drives the first rotation actuators 215 and 225 and the second rotation actuators 235 and 245. To be more specific, the controller 250 causes the first rotation actuators 215 and 225 and the second rotation actuators 235 and 245 to extend their piston rods.

As illustrated in FIGS. 14 and 17, the extension of the piston rods rotates the first wheel arm 212 and the second wheel arm 242 counterclockwise around their connections with the center member 201, and rotates the first wheel arm 222 and the second wheel arm 232 clockwise around their connections with the center member 201. Accordingly, the first wheels 210 and 220 and the second wheels 230 and 240 move toward the center of the vehicle platform 200 in the vehicle width direction, so that the first wheel 210 and the second wheel 230 move toward each other and the first wheel 220 and the second wheel 240 move toward each other. This reduces the distance (or track width) between the first wheels 210 and 220 and the second wheels 230 and 240. In this case, the first wheels 210 and 220 and the second wheels 230 and 240 move while their orientations are kept parallel or substantially parallel to the direction of travel of the vehicle platform 200 by the first orientation keepers 214 and 224 and the second orientation keepers 234 and 244.

For example, when a road width is wide, the operator is able to operate the operating element 251 so as to provide, to the controller 250, an instruction for increasing the distance (or track width) between the first wheels 210 and 220 and the second wheels 230 and 240. In this case, the controller 250 causes the first rotation actuators 215 and 225 and the second rotation actuators 235 and 245 to contract their piston rods.

As illustrated in FIGS. 14 and 17, the contraction of the piston rods rotates the first wheel arm 212 and the second wheel arm 242 clockwise around their connections with the center member 201, and rotates the first wheel arm 222 and the second wheel arm 232 counterclockwise around their connections with the center member 201. Accordingly, the first wheels 210 and 220 and the second wheels 230 and 240 move away from the center of the vehicle platform 200 in the vehicle width direction, so that the first wheel 210 and the second wheel 230 move away from each other and the first wheel 220 and the second wheel 240 move away from each other. This increases the distance (or track width) between the first wheels 210 and 220 and the second wheels 230 and 240. In this case, the first wheels 210 and 220 and the second wheels 230 and 240 move while their orientations are kept parallel or substantially parallel to the direction of travel of the vehicle platform 200 by the first orientation keepers 214 and 224 and the second orientation keepers 234 and 244.

The controller 250 may increase or reduce the distance (or track width) between the first wheels 210 and 220 and the second wheels 230 and 240 only while the operating element 251 is operated by the operator. The controller 250 may increase or reduce the track width between the first wheels 210 and 220 and the second wheels 230 and 240 by a predetermined distance each time the operating element 251 is operated by the operator. The operator may increase or reduce the distance (or track width) between the first wheels 210 and 220 and the second wheels 230 and 240 by operating the operating element 251 not only during travel of the vehicle platform 200 but also while the vehicle platform 200 is at rest.

The operator may operate the operating element 251 so as to activate the first rotation actuator 215 and the second rotation actuator 235 such that the distance (or track width) between the first wheel 210 and the second wheel 230 is increased or reduced. The operator may operate the operating element 251 so as to activate the first rotation actuator 225 and the second rotation actuator 245 such that the distance (or track width) between the first wheel 220 and the second wheel 240 is increased or reduced. The operator may operate the operating element 251 so as to activate the first rotation actuator 215 and the first rotation actuator 225 such that the distance (or track width) between the first wheels 210 and 220 and the second wheels 230 and 240 is increased or reduced. The operator may operate the operating element 251 so as to activate the second rotation actuator 235 and the second rotation actuator 245 such that the distance (or track width) between the first wheels 210 and 220 and the second wheels 230 and 240 is increased or reduced.

As will be understood from the above description of the second preferred embodiment, the first wheel arms 212 and 222 respectively connected to the first wheels 210 and 220 rotate relative to the center member 201, and the second wheel arms 232 and 242 respectively connected to the second wheels 230 and 240 rotate relative to the center member 201. The rotation of the first wheel arms 212 and 222 and the second wheel arms 232 and 242 moves the first wheels 210 and 220 and the second wheels 230 and 240 toward or away from the center member 201. The vehicle platform 200 thus allows the vehicle to travel while the distance (or track width) between the first wheels 210 and 220 and the second wheels 230 and 240 is reduced.

In the second preferred embodiment, the vehicle platform 200 is configured to move all of the four wheels (i.e., all of the first wheels 210 and 220 and the second wheels 230 and 240) in the vehicle width direction in a reciprocating manner. Alternatively, the vehicle platform 200 may be configured to move at least one of the four wheels (i.e., at least one of the first wheels 210 and 220 and the second wheels 230 and 240) in the vehicle width direction in a reciprocating manner. The vehicle platform 200 is thus able to increase or reduce the distance (or track width) between the first wheels 210 and 220 and the second wheels 230 and 240.

Figure 18:
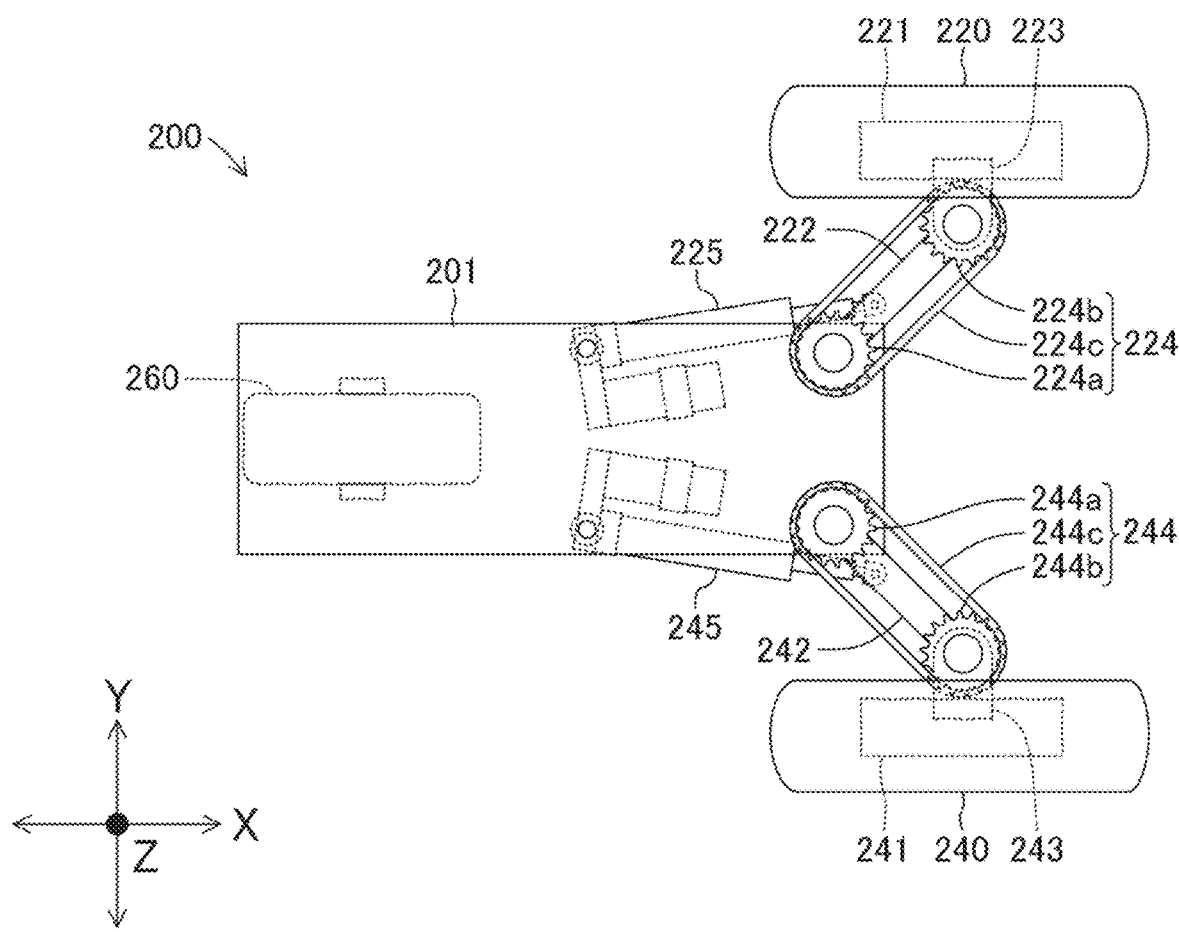
FIG. 18 is a schematic plan view of the external appearance of a vehicle platform according to a variation of the second preferred embodiment of the present invention.

In the second preferred embodiment, the vehicle platform 200 is a four-wheel platform including four wheels (i.e., the first wheels 210 and 220 and the second wheels 230 and 240). The vehicle platform 200 preferably includes at least a pair of right and left wheels, one of which is the first wheel 210 or 220 and the other one of which is the second wheel 230 or 240. As illustrated in FIG. 18, the vehicle platform 200 according to a variation of the second preferred embodiment is a three-wheel platform including the first wheel 220, the second wheel 240, and a third wheel 260 attached to a portion of the center member 201 located centrally in the vehicle width direction and away from the first wheel 220 and the second wheel 240.

The vehicle platform 100 according to the first preferred embodiment and the vehicle platform 200 according to the second preferred embodiment each define a self-propelled work vehicle for agricultural use. Naturally, vehicle platforms according to preferred embodiments of the present invention may be included in various work vehicles (such as work vehicles for civil engineering, disaster prevention, lifesaving, industrial use, and medical use) or may be included in various vehicles to carry people.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle platform of a vehicle, the vehicle platform comprising:
    a first wheel on a first side in a vehicle width direction;
    a second wheel on a second side in the vehicle width direction;
    a first wheel drive motor to drive the first wheel;
    a second wheel drive motor to drive the second wheel; and
    a first orientation keeper to move the first wheel in the vehicle width direction and keep an orientation of the first wheel with respect to a front-rear direction of the vehicle during movement of the first wheel; wherein
    the first orientation keeper includes:
        a center body between the first wheel and the second wheel and supported by the first wheel and the second wheel;
        a first wheel arm rotatably connected to the center body, extending between the center body and the first wheel, and supporting the first wheel; and
        a first rotation actuator to rotate the first wheel arm relative to the center body such that the first wheel moves toward or away from the center body; and
    the first wheel drive motor is located inward of an outermost end of the first wheel arm in the vehicle width direction, and the second wheel drive motor is located inward of an outermost end of a second wheel arm supporting the second wheel in the vehicle width direction.

2. The vehicle platform according to claim 1, further comprising a second orientation keeper to move the second wheel in the vehicle width direction and keep an orientation of the second wheel with respect to the front-rear direction of the vehicle during the movement of the second wheel; wherein
    the second orientation keeper includes:
        the second wheel arm rotatably connected to the center body and extending between the center body and the second wheel; and
        a second rotation actuator to rotate the second wheel arm relative to the center body such that the second wheel moves toward or away from the center body.

3. The vehicle platform according to claim 1, wherein the first orientation keeper includes a first supporting shaft extending vertically in the center body and supporting the first wheel arm such that the first wheel arm is rotatable.

4. The vehicle platform according to claim 2, wherein the second orientation keeper includes a second supporting shaft extending vertically in the center body and supporting the second wheel arm such that the second wheel arm is rotatable.

5. The vehicle platform according to claim 2, wherein the first orientation keeper includes:
    a first supporting shaft extending vertically in the center body and supporting the first wheel arm such that the first wheel arm is rotatable; and
    a first wheel support rotatably connected to the first wheel arm and supporting the first wheel provided thereon;
    the second orientation keeper includes:
    a second supporting shaft extending vertically in the center body and supporting the second wheel arm such that the second wheel arm is rotatable; and
    a second wheel support rotatably connected to the second wheel arm and supporting the second wheel thereon; and
    the first rotation actuator and the second rotation actuator are operable to rotate the first wheel arm around the first supporting shaft such that the first wheel support rotates, and rotate the second wheel arm around the second supporting shaft such that the second wheel support rotates, causing the first wheel and the second wheel to move in the vehicle width direction in a reciprocating manner.

6. The vehicle platform according to claim 5, wherein
    the first wheel includes a plurality of first wheels including a first front wheel and a first rear wheel;
    the second wheel includes a plurality of second wheels including a second front wheel and a second rear wheel;

the center body includes:
- a front center body between the first front wheel and the second front wheel and supported by the first front wheel and the second front wheel; and
- a rear center body between the first rear wheel and the second rear wheel and supported by the first rear wheel and the second rear wheel;

the first supporting shaft includes a plurality of first supporting shafts, and the second supporting shaft includes a plurality of second supporting shafts; and the first rotation actuator and the second rotation actuator are operable to move the first supporting shaft of the front center body and the first supporting shaft of the rear center body toward or away from each other in the front-rear direction of the vehicle, and move the second supporting shaft of the front center body and the second supporting shaft of the rear center body toward or away from each other in the front-rear direction of the vehicle.

7. The vehicle platform according to claim 2, wherein the first rotation actuator and the second rotation actuator are drivable during travel of the vehicle such that the first wheel and the second wheel move toward or away from the center body.

8. A vehicle platform of a vehicle, the vehicle platform comprising:
- a first wheel on a first side in a vehicle width direction;
- a second wheel on a second side in the vehicle width direction;
- a first wheel drive motor to drive the first wheel;
- a second wheel drive motor to drive the second wheel; and
- a distance changer to change a distance between the first wheel and the second wheel in the vehicle width direction; wherein the distance changer includes:
- a first wheel support supporting the first wheel and the first wheel drive motor; and
- a second wheel support supporting the second wheel and the second wheel drive motor;

the distance changer is configured or programmed to change the distance between the first wheel and the second wheel by moving at least one of the first wheel support and the second wheel support toward or away from the other one of the first wheel support and the second wheel support in the vehicle width direction;

with the first wheel and the second wheel located farthest away from each other in the vehicle width direction, the first wheel drive motor and the second wheel drive motor are located at different positions in at least one of a front-rear direction of the vehicle and an up-down direction of the vehicle; and the distance changer is configured or programmed to move the first wheel support and the second wheel support toward each other such that at least a portion of the first wheel drive motor and at least a portion of the second wheel drive motor are at a same position in the vehicle width direction when viewed from a position in front of the vehicle.

9. The vehicle platform according to claim 8, wherein with the first wheel and the second wheel located farthest away from each other in the vehicle width direction, the first wheel drive motor and the second wheel drive motor are located at different positions in the vehicle width direction when viewed from the position in front of the vehicle.

10. The vehicle platform according to claim 9, wherein with the first wheel and the second wheel located farthest away from each other in the vehicle width direction, the first wheel drive motor is located between the first wheel and a center line of the vehicle in the vehicle width direction, and the second wheel drive motor is located between the second wheel and the center line of the vehicle in the vehicle width direction, the center line extending in the front-rear direction of the vehicle.

11. The vehicle platform according to claim 10, wherein the first wheel drive motor and the second wheel drive motor are positioned at equal heights or substantially equal heights in the up-down direction of the vehicle.

12. The vehicle platform according to claim 10, wherein when the first wheel drive motor and the second wheel drive motor are located closest to each other in the vehicle width direction, the first wheel drive motor and the second wheel drive motor overlap with the center line in a plan view.

13. A vehicle platform of a vehicle, the vehicle platform comprising:
- a first wheel on a first side in a vehicle width direction;
- a second wheel on a second side in the vehicle width direction;
- a first wheel drive motor to drive the first wheel;
- a second wheel drive motor to drive the second wheel; and
- a first orientation keeper to move the first wheel in the vehicle width direction and keep an orientation of the first wheel with respect to a front-rear direction of the vehicle during movement of the first wheel; wherein the first orientation keeper includes:
- a center body between the first wheel and the second wheel and supported by the first wheel and the second wheel;
- a first wheel arm rotatably connected to the center body, extending between the center body and the first wheel, and supporting the first wheel; and
- a first rotation actuator to rotate the first wheel arm relative to the center body such that the first wheel moves toward or away from the center body; and the first wheel drive motor is located entirely rearward of the first wheel arm that is located farthest forward of any first wheel arm, and the second wheel drive motor is located entirely forward of a second wheel arm supporting the second wheel that is located farthest rearward among any second wheel arm.

14. A vehicle platform of a vehicle, the vehicle platform comprising:
- a first wheel on a first side in a vehicle width direction;
- a second wheel on a second side in the vehicle width direction;
- a first wheel drive motor to drive the first wheel;
- a second wheel drive motor to drive the second wheel; and
- a first orientation keeper to move the first wheel in the vehicle width direction and keep an orientation of the first wheel with respect to a front-rear direction of the vehicle during movement of the first wheel; wherein the first orientation keeper includes:
- a center body between the first wheel and the second wheel and supported by the first wheel and the second wheel;
- a first wheel arm rotatably connected to the center body, extending between the center body and the first wheel, and supporting the first wheel; and
- a first rotation actuator to rotate the first wheel arm relative to the center body such that the first wheel moves toward or away from the center body; and one of the first wheel drive motor and the second wheel drive motor is located forward of a center of the vehicle in the front-rear direction, and the other of the first wheel drive motor and the second wheel drive motor is located rearward of the center of the vehicle in the front-rear direction.

\* \* \* \* \*